(12) United States Patent
Panas et al.

(10) Patent No.: US 10,469,021 B2
(45) Date of Patent: Nov. 5, 2019

(54) AIRBORNE RENEWABLE ENERGY GENERATION AND STORAGE

(71) Applicant: Aetherix Corporation, Livermore, CA (US)

(72) Inventors: Robert Matthew Panas, Livermore, CA (US); Philip Rettger, Moraga, CA (US); Cynthia Panas, Livermore, CA (US); Jonathan Harrington, Mountain View, CA (US); Matthew Offenbacher, North Grafton, MA (US)

( * ) Notice: Subject to any disclaimer, the term of this patent is extended or adjusted under 35 U.S.C. 154(b) by 575 days.

(21) Appl. No.: 15/295,165

(22) Filed: Oct. 17, 2016

(65) Prior Publication Data

US 2018/0109223 A1 Apr. 19, 2018

(51) Int. Cl.
| | |
|---|---|
| *H02S 10/40* | (2014.01) |
| *B64B 1/58* | (2006.01) |
| *H02S 40/38* | (2014.01) |
| *H02S 20/32* | (2014.01) |

(52) U.S. Cl.
CPC .............. *H02S 10/40* (2014.12); *B64B 1/58* (2013.01); *H02S 20/32* (2014.12); *H02S 40/38* (2014.12); *B64C 2201/022* (2013.01); *B64C 2201/12* (2013.01)

(58) Field of Classification Search
CPC .......... H02S 10/40; H02S 20/32; H02S 40/38; B64B 1/58; B64C 2201/022; B64C 2201/12
USPC ......................................................... 244/31
See application file for complete search history.

(56) References Cited

U.S. PATENT DOCUMENTS

| | | | |
|---|---|---|---|
| 3,103,330 A | 9/1963 | Nelson et al. | |
| 4,364,532 A * | 12/1982 | Stark | B64B 1/00 244/30 |
| 4,773,617 A * | 9/1988 | McCampbell | B64B 1/60 244/128 |
| 4,995,572 A | 2/1991 | Piasecki | |
| 5,115,997 A | 5/1992 | Peterson | |
| (Continued) | | | |

FOREIGN PATENT DOCUMENTS

| | | | | |
|---|---|---|---|---|
| CA | 2884385 A1 * | 4/2014 | ............. | B60L 8/003 |
| CA | 2936127 A1 * | 1/2017 | ........... | H01L 31/046 |
| (Continued) | | | | |

*Primary Examiner* — Christopher P Ellis
(74) *Attorney, Agent, or Firm* — Nath, Goldberg & Meyer; Jerald L. Meyer; Stanley N. Protigal

(57) ABSTRACT

An energy collection system uses one or more airborne energy collection vehicles having a lighter-than-air balloon structure. The balloon structure has an outer gas envelope formed of a substantially inelastic material and an inner gas envelope at least partially separate from the outer gas envelope, contained within the outer gas envelope and separated from the outer gas envelope by a flexible diaphragm. The space between the outer and inner gas envelopes is filled with air. An air chamber pressurization mechanism maintains the outer gas envelope gas pressure at a target value. An energy storage facility receives energy from a photovoltaic collector array and converts the received energy to stored energy. Storage of the received energy can be accomplished by conversion of a precursor to a high energy fuel as the stored energy, by use of storage batteries or by storage in an inertial mass.

22 Claims, 11 Drawing Sheets

(56) References Cited

U.S. PATENT DOCUMENTS

| | | | |
|---|---|---|---|
| 5,368,256 A | 11/1994 | Kalisz et al. | |
| 5,518,205 A | 5/1996 | Wurst et al. | |
| 5,645,248 A * | 7/1997 | Campbell | B64B 1/00 244/125 |
| 5,810,284 A | 9/1998 | Hibbs et al. | |
| 6,131,851 A | 10/2000 | Williams | |
| 6,354,535 B1 | 3/2002 | Perry et al. | |
| 6,386,480 B1 | 5/2002 | Perry et al. | |
| 6,427,943 B2 | 8/2002 | Yokomaku et al. | |
| 6,540,178 B1 * | 4/2003 | Hillsdon | B64B 1/24 244/127 |
| 6,607,163 B2 | 8/2003 | Perry et al. | |
| 6,648,272 B1 | 11/2003 | Kothmann | |
| 6,896,222 B2 | 5/2005 | Dossas et al. | |
| 6,966,523 B2 | 11/2005 | Colting | |
| 7,137,592 B2 * | 11/2006 | Barocela | B64B 1/06 244/29 |
| 7,249,733 B2 | 7/2007 | Palmer | |
| 7,278,607 B2 | 10/2007 | Fuller | |
| 7,448,572 B2 * | 11/2008 | Marimon | B64B 1/02 244/127 |
| 7,469,857 B2 * | 12/2008 | Voss | B64B 1/60 244/96 |
| 7,568,656 B2 | 8/2009 | Handley | |
| 7,781,112 B2 | 8/2010 | Sridhar et al. | |
| 7,887,007 B2 | 2/2011 | Mitchell | |
| 8,006,933 B2 | 8/2011 | Tillotson | |
| 8,020,805 B2 | 9/2011 | Choi et al. | |
| 8,336,810 B2 | 12/2012 | Brutoco | |
| 8,448,894 B2 | 5/2013 | LaForge | |
| 8,820,681 B2 | 9/2014 | Brutoco | |
| 8,864,063 B2 * | 10/2014 | Heppe | B64B 1/00 244/30 |
| 8,894,002 B2 | 11/2014 | Goelet | |
| 8,899,514 B2 | 12/2014 | Goelet | |
| 8,939,396 B2 | 1/2015 | Geneste | |
| 9,016,622 B1 | 4/2015 | Pasternak | |
| 9,151,272 B2 * | 10/2015 | Goessling | F03D 7/026 |
| 9,246,433 B2 * | 1/2016 | Goldstein | H01L 31/042 |
| 2008/0092541 A1 | 4/2008 | Palmer | |
| 2008/0272233 A1 | 11/2008 | Marlin | |
| 2011/0315546 A1 | 12/2011 | Geneste | |
| 2012/0138733 A1 | 6/2012 | Hiebl et al. | |
| 2014/0048646 A1 | 2/2014 | Devaul et al. | |
| 2014/0158823 A1 | 6/2014 | Smith et al. | |
| 2016/0307448 A1 * | 10/2016 | Salnikov | A01B 79/02 |
| 2019/0039427 A1 * | 2/2019 | Hartshorn | B60F 5/02 |

FOREIGN PATENT DOCUMENTS

| | | | |
|---|---|---|---|
| DE | 2754114 A1 | 6/1979 | |
| DE | 4431576 A1 * | 3/1996 | B64B 1/50 |
| EP | 0312075 A1 | 4/1989 | |
| WO | 2006028398 A1 | 3/2006 | |
| WO | WO-2014028201 A2 * | 2/2014 | H02S 20/00 |

* cited by examiner

AIRBORNE RENEWABLE ENERGY GENERATION AND STORAGE

BACKGROUND

Field

The present disclosure relates to the field of renewable energy production. More specifically, the disclosed technology relates to an autonomous unmanned aircraft system coupled with a solar energy collection element, an electricity generation element and an electro-chemical cell, which is intended to capture solar energy at altitude.

Background

The demand for renewable sources of energy is expanding rapidly as we gain understanding of the impacts of fossil fuels. Of the various sources of renewable energy available, solar power generation may have the greatest potential but as yet has been held to a fraction of global power supply. This is due primarily to several limitations in its traditional modes of implementation. These limitations include the cost of installation, unreliability of the power supply, and non-uniform accessibility to solar energy. More specifically, a traditional solar installation's output will vary dramatically depending weather, season, location and time of day—including the obvious situation that no energy is produced at night. Some geographical areas are less suitable than others due to overall weather patterns or being further from the equator. Currently, these issues are mitigated through paring solar installations with fossil fuel back-up generators or through battery storage. These additional requirements greatly increase the cost of solar installations while still failing to free solar energy from geographical constraints.

The disclosed technology is an "aerosolar" energy harvesting system, capable of harvesting solar energy from an airborne platform. An aerosolar energy harvesting system shifts the location of solar energy capture to a lighter-than-air Unmanned Aerial Vehicle (UAV) and includes an onboard electro-chemical cell so that energy can be stored to be distributed later and used where and when it is needed. This provides several benefits. First, the placement of solar energy collectors on an aerial platform allows the conversion to be used at high altitude, such as in the tropopause, an elevation with predictable and reliable sunlight exposure at several times greater yearly insolation than at ground level regardless of geographic location. Second, the storage of generated electricity in batteries allows the stored energy to be used at whatever time it is needed, eliminating the need for other costly storage or backup power plant installations. Third, if the system is used to produce hydrogen, the storage medium of hydrogen gas can be marketed directly to the hydrogen fuel economy or (along with the oxygen also produced as part of the electrolysis process), and sold as a high purity gas for medical or research purposes.

SUMMARY

An energy generating system uses an airborne energy collection vehicle having a balloon structure. The balloon structure has a lighter than air envelope structure with an outer gas envelope formed of a substantially inelastic material and at least one inner gas envelope at least partially separate from the outer gas envelope. The inner gas envelope is at least partially contained within the outer gas envelope, and is configured to hold lifting gas as a buoyancy medium, with at least a portion of a space between the inner gas envelope and outer gas envelope filled with air. A flexible diaphragm forms at least a portion of the inner gas envelope separate from the outer gas envelope and is contained within the outer gas envelope. The flexible diaphragm causes the inner gas envelope to maintain an equilibrium pressure with the outer gas envelope and allows expansion and contraction of the inner gas envelope to substantially fill the space of the outer gas envelope from a relatively smaller fraction of the outer gas envelope. An air chamber pressurization mechanism is provided, which is capable of maintaining the outer gas envelope gas pressure at a target value. An air chamber pressurization controller monitors the outer gas envelope pressure and either pumps in air or vents air to bring a gauge pressure to the target value.

A photovoltaic collector array receives solar energy and an energy storage facility receives energy from the photovoltaic collector array and converts the energy to stored energy. In one configuration, the energy storage is accomplished by converting a precursor to a high energy fuel. In another configuration, energy storage is provided by storage batteries. In another configuration, energy storage is provided by one or more inertial masses.

DETAILED DESCRIPTION

Overview

Figure 1A:
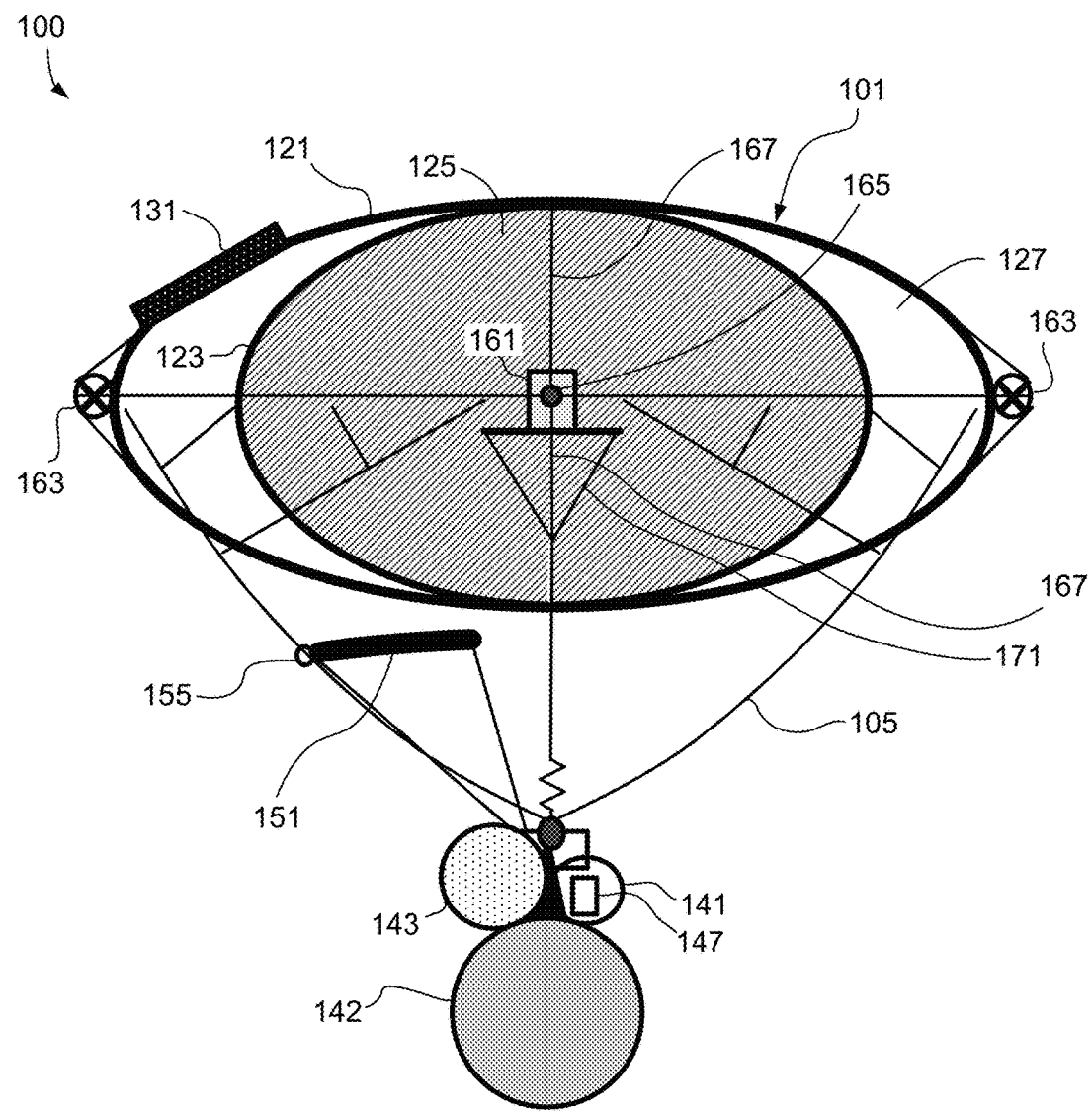
FIGS. 1A-1E are schematic diagrams showing side views (FIGS. 1A and 1B) and end views (FIGS. 1C-1E) of an airborne floating solar energy facility.

The aerosolar energy harvesting system taps into a renewable source which has the critical qualities needed for next generation global power supply—namely, the aerosolar energy harvesting system is safe, scalable, clean, accessible, affordable, and stable. The proposed system is safe because it uses only easily controllable photovoltaic systems. It is scalable and clean because production increases with a number of airborne floating solar energy facilities and draws on solar energy, which is the most plentiful source of power. The aerosolar energy harvesting system is accessible because the tropopause is available from any point on the planet. It is affordable because the solar power densities in the tropopause run significantly higher than for grounded systems, and stable because the capture generally occurs above the weather of the lower atmosphere, so it is a reliable daily resource.

The airborne floating solar energy facility is an autonomous mobile platform coupled with a solar energy collection element and an electro-chemical cell. In one non-limiting example, the electro-chemical cell stores energy by drawing in low-energy precursor chemical(s), adding energy via a chemical reaction, and storing the resulting fuel and possibly oxidizer (later referred to as part of the "fuel") chemical(s) as a form of chemical potential energy as a high energy fuel. For purposes of this description, a "high energy fuel" references a fuel with substantial chemical energy density, such as hydrogen or hydrogen and oxygen. Hydrogen has a specific energy value of 142 MJ/kg, which contrasts with methane at 55 MJ/kg, diesel fuel at 45-50 MJ/kg and methanol at 20 MJ/kg. For purposes of this description, a fuel with a specific energy value of at least 10 MJ/kg would be "high energy" because it is effective for storage of energy. High energy fuels having a specific energy value of at least 25 MJ/kg are desirable, and high energy fuels having a specific energy value of at least 90 MJ/kg are more desirable.

While oxygen is chemically not a fuel, purified oxygen can be used to enhance energy production, and for the purposes of storing energy, oxygen is described as part of a fuel payload because it has an energy producing value.

In another non-limiting example, called the "battery approach", the electro-chemical cell is a battery system, such as a lithium-ion battery system.

One non-limiting example mode for a solar to chemical energy conversion system is a photovoltaic collector array driving the electrolysis of water. The solar collector is mounted to an inflated balloon where it converts sunlight to usable energy. In one non-limiting example mode, called the "hydrogen approach", the solar panel electricity is used to power an electrolysis unit producing hydrogen and oxygen. The hydrogen and oxygen are stored in attached tanks and in the balloon envelope itself. Thus, according to the hydrogen approach, not only is the hydrogen the end product, but it also can be the lifting gas used to keep the system afloat.

The unmanned airborne floating solar energy facility is intended to be one of a group or school of airborne energy collection vehicles, which function as airborne floating energy facilities. The airborne floating energy facilities are solar energy facilities within close proximity to each other and working with at least one landing/loading station. This landing/loading station may be on the ground, may be aloft, or may be afloat on a ground-based vehicle such as a ship. In the hydrogen approach, an airborne floating solar energy facility takes off from the station with a full load of water, and ascends above the clouds into the tropopause region. The airborne floating solar energy facility resides in the tropopause region until it has collected enough energy to largely convert their supply of precursor to fuel, which in the example version, is a conversion of the water supply to hydrogen. Once the conversion is complete, the solar energy facility descends back to the ground station where the energy stored in the airborne floating solar energy facility is offloaded, via either transfer of the fuel or via chemical reaction, and the precursor supply is replenished. In this example version, this means offloading the generated hydrogen and oxygen; then refilling with water. The solar energy facility then re-launches, repeating the cycle endlessly, except for maintenance. The solar energy facilities will thus supply a consistent supply of energy to the station, scaling with the number of solar energy facilities.

In the battery approach, the solar energy facility takes off with a load of substantially discharged batteries. The batteries are charged while the facility is airborne and the facility descends back to the ground station to discharge the batteries to deliver the captures and stored electricity to a customer of the electrical grid, with conversion of the electricity to alternating current as required.

Floating Solar Energy Facility Components

FIGS. 1A-1E are schematic diagrams showing side views (FIGS. 1A and 1B) and end views (FIGS. 1C-1E) of an airborne floating solar energy facility 100. In overview, the airborne floating solar energy facility 100 comprises balloon section 101 or balloon structure, and externally carried section, described as a keel 102. Keel 102 is attached to balloon section 101 by tethers, including main keel tether 105.

The balloon section 101 comprises outer envelope 121, within which is positioned inner envelope 123. Inner envelope 123 forms lift gas chamber 125, which contains a lift gas such as, by way of non-limiting example, hydrogen. The space between inner envelope 123 and outer envelope 121 is air chamber 127, which is pressurized to establish balloon section 101 as a superpressure balloon.

Balloon section 101 also supports solar panels 131, which, by way of non-limiting example, are mounted on an exterior of outer envelope 121.

Keel 102 supports component which are external to balloon section 101, which may comprise fuel storage components. In the example of use of a battery for storage of energy, the battery may be located in keel 102.

In the example of the production of high energy fuel, keel 102 may carry water tank 141 which carried a precursor (water), hydrogen storage tank 142 and oxygen storage tank 143. Electrolysis unit 147 may also be located in keel 102 and receive energy from solar panels 131.

Figure 1B:
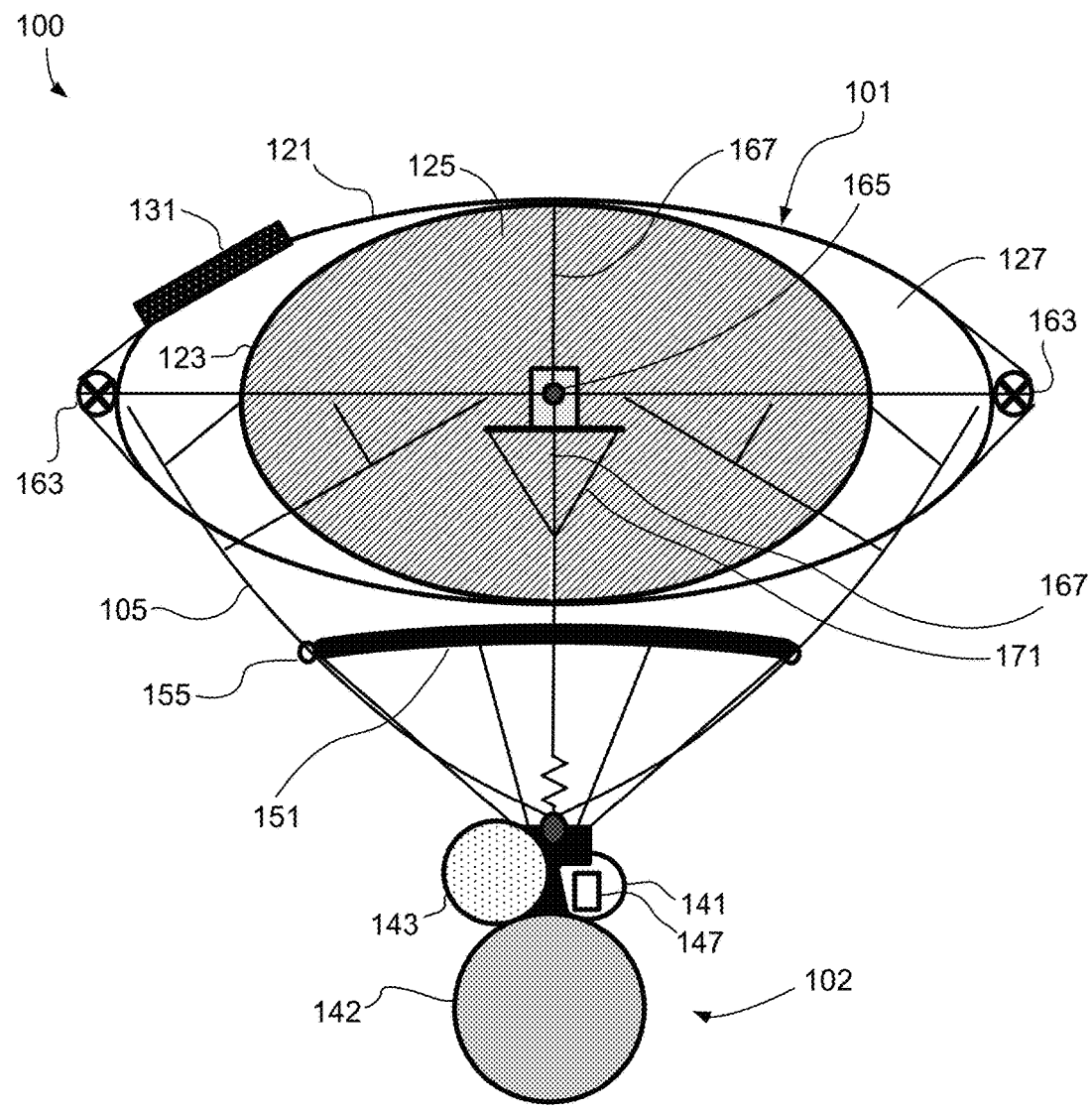

Also provided on airborne floating solar energy facility 100 is wing 151, which is depicted in FIG. 1A in a partially retracted state, and in FIG. 1B in an unfurled state, controlled by wing bearing 153 mounted on main keel tether 105.

Inner envelope encloses a lift gas chamber. Between the interior and the exterior envelope is the air chamber. Two sets of thrusters 161, 163 are attached to the inflated balloon 101, with set 161 able to generate thrust in the X-axis and set 163 able to generate thrust in the Y-axis. X-axis thrusters 161 are anchored in place by attachment to compression bar 165, which has one end held in location by vertical tension cables 167 and horizontal tension cables 168. This compression bar also acts as a rotary axis for X-axis thrusters 161, which are forced to an orientation by the vertical tension line running down to the keel 102. This line forms a Y shape 171 with a main cable that splits into two arms below X-axis thrusters 161. These two arms attach to either end of the horizontal lever arm on X-axis thrusters 161. The bottom of the Y 171 contains a compliant element to account for length changes. The keel mass is held by main keel tether 105 which branches out at is approaches the balloon equator. Each branch point uses a small bearing to allow for readjustment of the tension direction on the branching network.

Wing is attached to the main keel tether via a bearing, and controlled via lines driven by motors on the keel payload. The keel payload contains, in the hydrogen energy storage instantiation, a water tank, an electrolysis unit, a hydrogen tank and an oxygen tank.

The balloon is formed in an ellipsoid shape, symmetric around the Y-Z plane to provide equivalent drag whether the wind is flowing in the +x or −x axis direction. This ellipsoid shape includes the long axis (X-axis) being longer than the Y- and Z-axes, which is intended to minimize drag for flows that occurs around a sphere, allowing the given thrust force to produce higher relative travel velocity during landing, and resist higher wind gusts during geostationary operation.

Figure 1E:
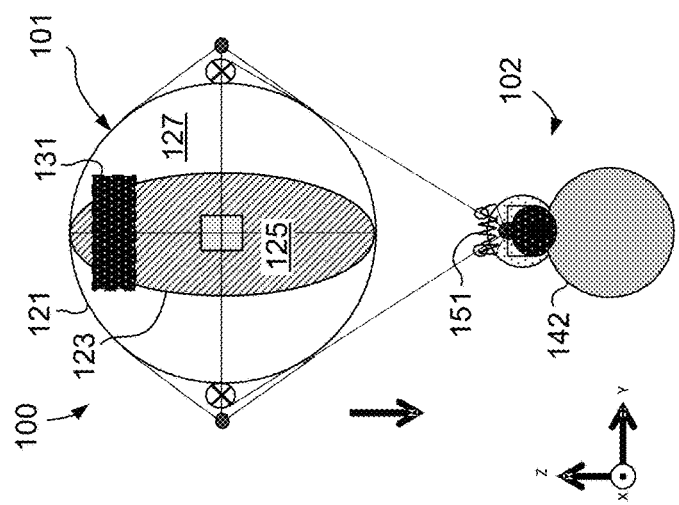
Figure 1D:
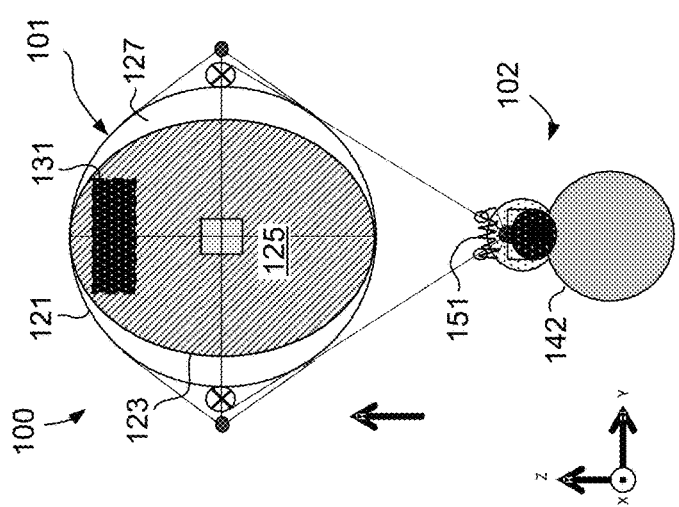
Figure 1C:
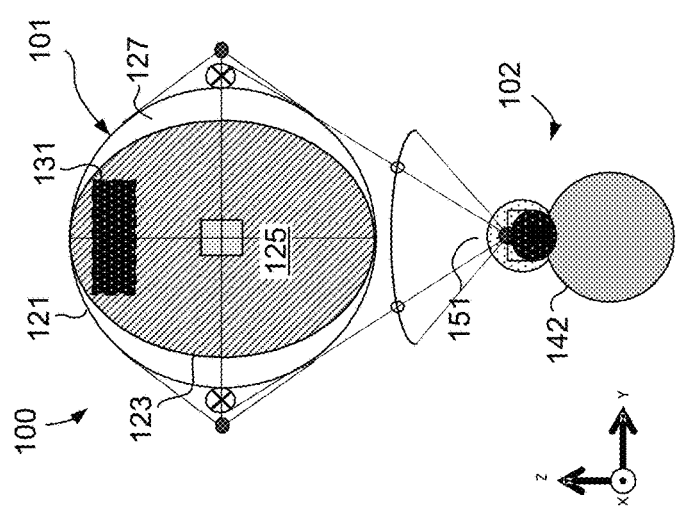

As can be seen between FIGS. 1D and 1E, expansion of air chamber 127 results in contraction of lift gas chamber 125. This establishes a "reverse ballonet" configuration, in which the lift gas is in the interior envelope 123.

The exterior balloon skin of outer envelope 121 should be able to handle ultraviolet (UV) radiation, low temperatures and moderate continuous stress, while resisting significant gas diffusion. The presently envisioned skin is a metalized polymer, high strength fabric laminate. In one version, the balloon skin is protected by an aluminization layer. The aluminization layer is a few 10's of nm thick aluminum film deposited on an approximately 10 μm Biaxially-oriented polyethylene terephthalate (BoPET) layer. The aluminum layer reduces the balloon's gas permeability. The metallized balloon skin is attached to a high strength fabric such as a Kuraray Vectran™, Kevlar®, or carbon fiber weave, which is sized to ensure a significant (>10×) safety factor. The metallized base layer may be coated while the high strength fabric is under strain (thermal or mechanical) to ensure the film is slightly compressively preloaded. The compressive preload should be tuned to largely cancel the balloon gauge overpressure induced stress. A cross-layered load layer composed of thin strands like a window screen will act to halt tear formation in the gas blocking layer. An additional thin, and easily replaceable, UV resistant layer such as metallized-face-out-Mylar® or polyethylene terephthalate (PET) may be placed over the sunward facing part of the balloon (on top of the load layer, connected at certain mounting points) to act as a sunblock and reduce balloon skin damage.

Inner envelope 123 is protected from external damage by outer envelope 121. Inner envelope 123 is designed to efficiently contain lift gas, but is flexible enough to contain the lift gas with little pressure differential between lift gas chamber 125 and air chamber 127.

Figure 2:
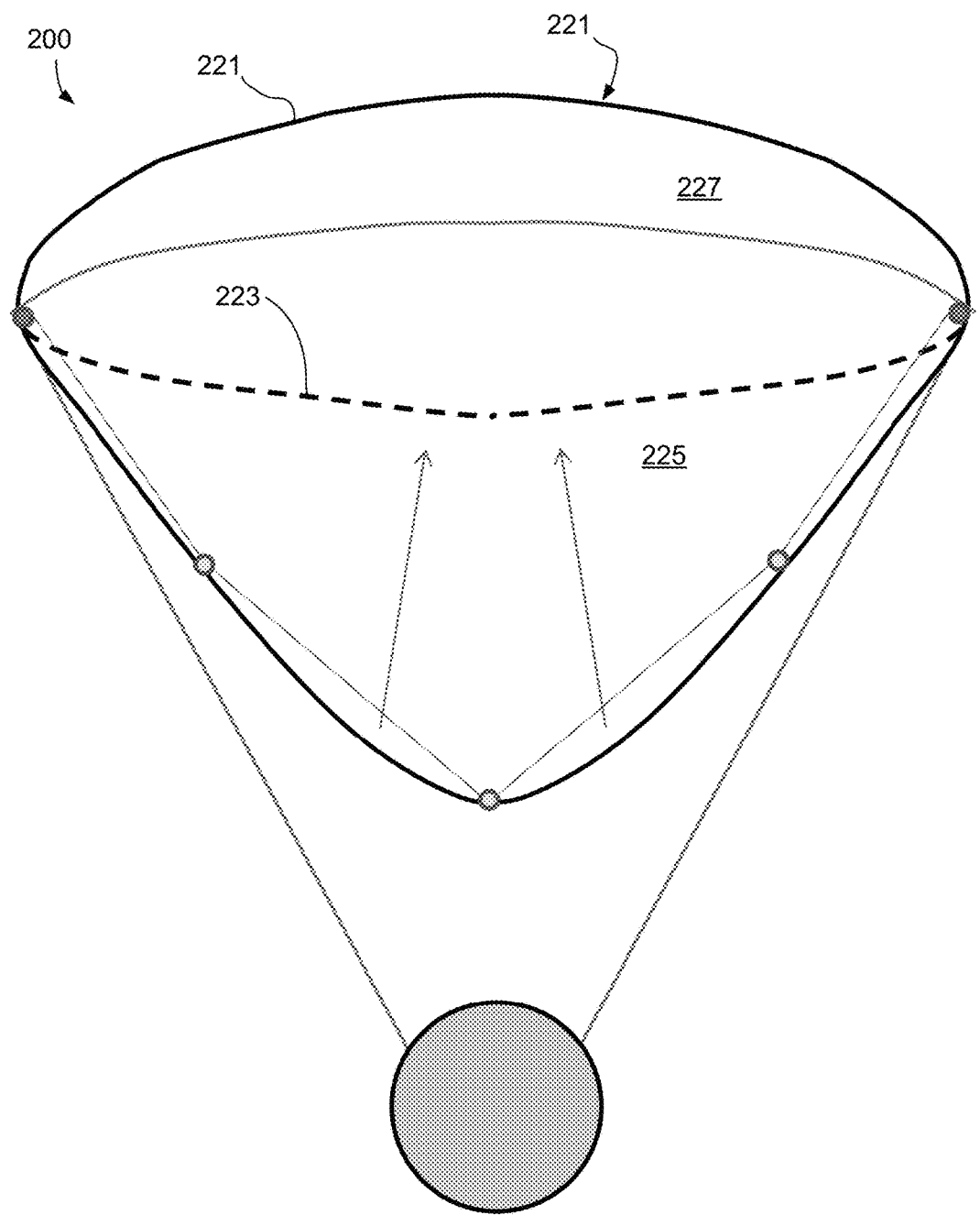
FIG. 2 is a configuration in which a balloon section uses a diaphragm to establish a separate lift gas chamber and air chamber.

FIG. 2 is a configuration in which balloon section 201 uses outer envelope 221 and diaphragm 223 to establish separate lift gas chamber 225 and air chamber 227. Diaphragm 223 is a highly flexible diaphragm which separates the overall shape into two distinct chambers or envelopes 225, 227, an outer envelope and an inner envelope. Diaphragm 223 may be either elastic or non-elastic, however non-elastic is preferred. Diaphragm 223 should include extra material so it can be deformed to change the relative chamber sizes of outer envelope (air chamber) 227 and inner envelope (lift chamber) 225. The non-elastic nature of diaphragm 223 is considered for two reasons. First, the low strain cycling during operation reduces the damage to the diaphragm material; second it helps to effectively pass pressures between the two chambers 225, 227, so they are always nearly equal in pressure. One side of the diaphragm is filled with lift gas, which is hydrogen in one non-limiting example configuration, but could also be other lighter-than-air gases and mixtures such as helium, ammonia or a hydrogen and helium mixture. The other side of diaphragm 223 is filled with ambient atmospheric gas (air). In a non-limiting example, diaphragm 223 is able to allow the lift chamber 225 to occupy from about 5% up to about 95% of the total balloon volume. In the example, the structure of diaphragm 223 is that of a separate balloon within the main volume, such that the hydrogen containing chamber 225 is not in direct contact with the exterior of the balloon 201 at nearly any point. This ensures that the lift gas, a flammable gas in this instantiation, is separated from ignition or puncturing objects by an insulating layer of air. Any tears in the exterior balloon would then force the venting of air rather than valuable lift gas. Additionally, any contact with an external flame source would not ignite the hydrogen, but would rather only cause the exterior surface to char.

The construction is roughly that of a reverse ballonet configuration, as the primary lifting gas is held in the inner envelope and air or a secondary gas held in the outer envelope (between the inner and outer envelopes). The result is that the inner envelope is used to maintain a sealed environment to prevent lift-gas loss, whereas structural integrity and ultraviolet light resistance is provided by the outer envelope.

While a two envelope configuration is described, it is also possible to provide additional envelopes as convenient, such as for providing a secondary lifting gas that is expected to remain contained within the airborne floating solar energy facility at all times during flight, or for more layers of containment around the lift gas envelope. One example of extra layers of containment would be a design with (referring to FIGS. 1A and 1B) inner lift gas envelope 123, then a second "backup" envelope (not separately shown) around inner lift gas envelope 123. The space between these two envelopes could be filled with an inert lift gas, such as helium. Finally, these two envelopes would be placed within the exterior balloon envelope. The dual inner envelope design would provide a cushioning layer of inflammable gas that still provides lift but would not ignite. The gas in the "backup" envelope could be sensed for the interior lift gas—hydrogen in the example—as well as air. Likewise the air envelope could be sensed for hydrogen and helium. Finally, the innermost inner hydrogen envelope could be sensed for helium. Detection of these gases would determine where a tear had occurred, yet due to the intervening inert gas, such a tear would not immediately result in a flammable gas mixture. This would provide the system time to return to ground for repairs before the gas mixture became dangerous. The air blower can be used to blow air into the air chamber if a hydrogen leak is detected. The air flow will act to disperse the hydrogen so it is kept below the flammable threshold (4% by volume). The air and hydrogen mixture can be drawn out of the air envelope either by one of the air blowers running in reverse, or special vents located around the balloon. These special vents could be located at the top of the air envelope to help selectively vent the lighter-than-air gas.

Placing the lifting gas in the inner chamber 125, 225 reduces the chance of a puncture that drains all the lift capability from the balloon, or the ignition of the lift gas. This also simplifies the fabrication of the balloon, as two separate structures. The balloon fabric design is also decoupled, as the exterior fabric does not have to have nearly as high quality impermeability since it only keeps in pressurized air. Likewise, the interior balloon fabric is not operating with any significant skin stresses, so does not require nearly the same reinforcement layer as the exterior skin. Since the external surface of the balloon is the outer chamber, ultraviolet exposure is encountered by the outer enclosure, which is also protected by the aluminization. The inner envelope is designed to be gas impermeable and relies on the external metallized skin to provide UV protection. The reverse ballonet configuration also has advantages in terms of safety, in that the lift gas, if flammable, is not as exposed to external damage as would be the case if the hydrogen were contained by the outer envelope.

The outer gas envelope is made of reinforced material which is substantially inelastic. Significantly, the outer gas envelope is constructed to be highly resistant to ultraviolet energy, such as is experienced in the tropopause. Ultraviolet protection can be achieved by the material being inherently ultraviolet resistant, by aluminization or other protective coating, or by being covered by other components such as a replaceable UV Mylar film cover, or the photovoltaic collector arrays, at least where the photovoltaic collector arrays are located. The outer gas envelope may be designed to be ultraviolet opaque, so as to protect the inner gas envelope from the effects of ultraviolet radiation.

The use of the reverse ballonet design results in placing the lift gas in the inner envelope. Placing the lift gas in inner lift gas envelope 123 provides various advantages which have previously been described and are repeated here in list form for completeness, including:

1) A reduction in surface area of the lift gas volume, so a reduced likelihood of lift gas loss through tears. There is only one balloon surface (inner), as opposed to two (inner and outer) that contains the lifting gas.
2) A decoupling of the outer balloon skin functions. In a conventional design the outer balloon skin is both a gas containment and a tensile load layer. In the dual chamber design, limited failure of the gas containment is acceptable, as a limited tear in the outer skin results only in the loss of air pressure; not valuable lift gas. This is a significantly more recoverable scenario, and one that the operator can expect to encounter when undergoing rapid sustained cycling.
3) A decoupling of the gas containment layer. In a conventional design both the interior and exterior balloon must contain the lift gas, so a material must be found that retains low permeability under harsh conditions—UV and tensile loading. In the disclosed design, the low permeability layer is largely decoupled from these two other conditions, so the material design can be much simpler. This is expected to increase the lifetime of the airborne floating solar energy facility and reduce the leakage rates of lift gas.
4) The reverse ballonet design provides an additional skin layer between external structures and the lift gas balloon, acting in a limited fashion to guard the inner envelope, holding the primary lift gas, from puncture.
5) The increased surface area between the air chamber and the exterior helps achieve both rapid thermal equilibration (needed for rapid rise/fall) and helps to provide multiple means for to exchange air. Based on the design topology, a single access point at the bottom of the balloon such as would be found with conventional ballonet designs would hinder the air transfer capabilities.

While inner and outer chambers are described, it is possible to combine a portion of the inner and outer chambers, so that at portions of the balloon, the inner and outer envelope materials are combined. In one non-limiting configuration, the combination of the inner and outer materials occurs at the bottom of the balloon, whereas a separate air chamber exists at the top of the balloon, separating the inner and outer envelope. This point of combination in the inner and outer chambers is an ideal location to pass through tubing and other connections from the exterior of the balloon to the lift chamber.

The center of lift is similarly located to the conventional ballonet design. The interior lift gas balloon is able to fill the entire volume, so it does not impede the lift gas from settling against the top of the balloon at low altitudes, the same as the conventional ballonet design. This places the center of lift well above the center of the balloon. The externally carried section carried by the balloon will further shift the center of mass downwards, so static stability issues are not anticipated.

Control of Lift

While hydrogen is described as both the lifting gas and the high energy fuel, it is also possible to use other gasses such as He, ammonia, hydrogen/helium mixtures, etc., as lighter than air lifting gasses. This can be particularly useful if the other gas is expected to be retained in the balloon after transfer of the high energy fuel, or is otherwise used in the handling of the high energy fuel or the low-energy precursor. Such an alternative lifting gas can be retained either within the inner envelope, or within the outer envelope separate from the gas in the inner envelope. To that end, the alternative lifting gas may be kept sealed off from other gases within the balloon with flexible diaphragms or by other means. The alternative lifting gas may be mixed with other gases if it is easily separated from the produced fuel, or is acceptable as a component of the produced fuel.

Figure 3:
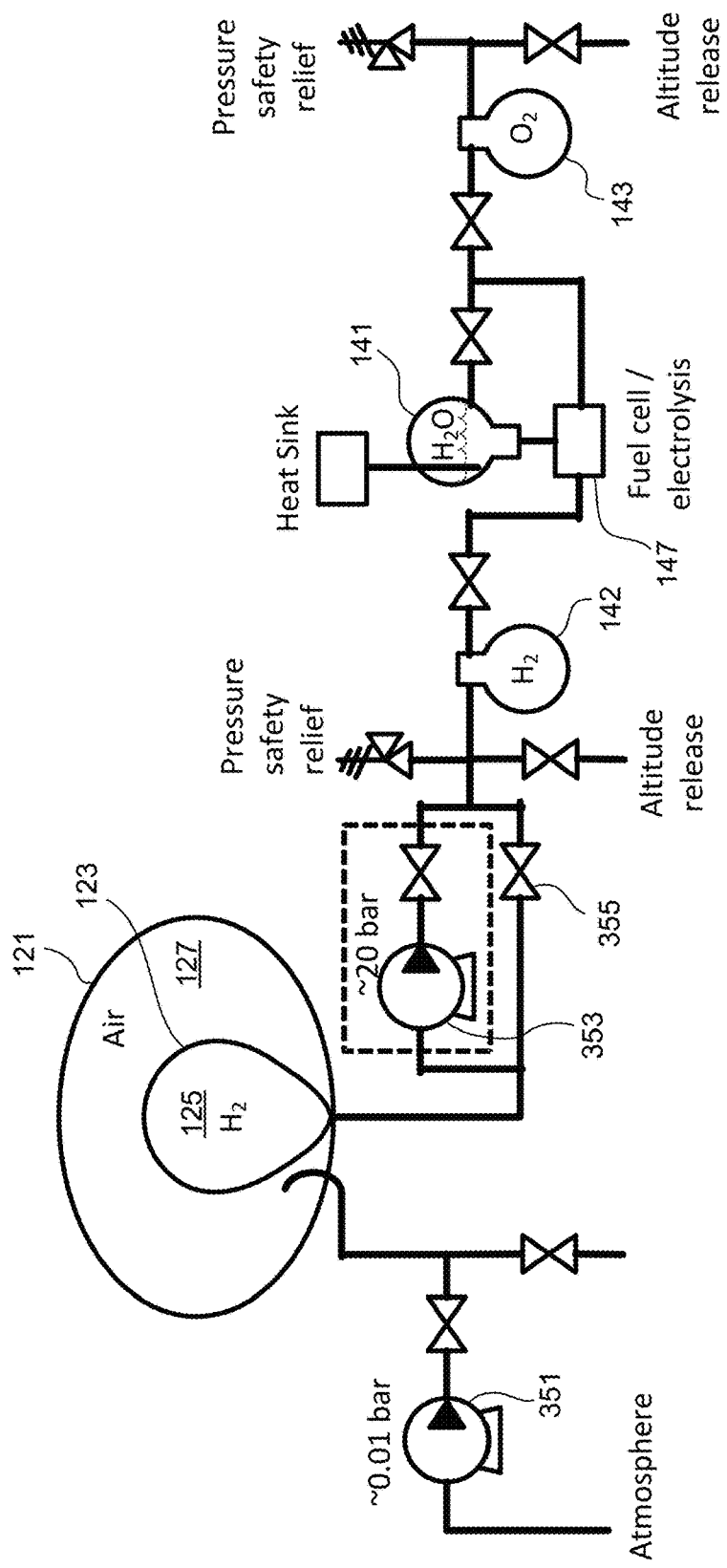
FIG. 3 is a schematic diagram showing a lift control system.

FIG. 3 is a schematic diagram showing a lift control system. Depicted is balloon section 101 with outer and inner envelopes 121, 123, forming lift gas chamber 125, and air chamber 127. Also depicted are precursor supply tank 141, hydrogen storage tank 142, oxygen storage tank 143 and electrolysis unit 147, which are located in keel 102 (FIGS. 1A-1E). Superpressure pump 351 provides air to air chamber 127. Lift gas is optionally pumped from lift gas chamber 125 to hydrogen storage tank 142. The lift gas is admitted to lift gas chamber 125 from hydrogen storage tank 142 by means of valve 255. In addition, in the "hydrogen approach", electrolysis/fuel cell unit 147 generates hydrogen and oxygen which are stored in tanks 142 and 143 and extracts energy from the hydrogen and oxygen as required.

The lift control system is fundamentally a dual parameter decoupled control of both buoyancy and balloon pressure. For most of the drone operation, it is less energy intensive to operate the system like the simpler and more common single parameter control of the balloon pressure where buoyancy and pressure are linked. This single parameter mode is a subset of the dual parameter mode that can be engaged by halting the modulation of the lift gas mass. The single mode control only works well in limited conditions, which are easily exceeded in emergencies. The dual control framework provides the unique opportunity to switch to the more complex mode in certain cases, such as these emergencies, to provide an additional layer of redundancy.

Dual parameter decoupled control means the operation of two parallel control loops, one for buoyancy or lift force, and one for balloon pressure. The buoyancy control loop holds the net buoyant force on the whole blimp to a commanded value by adding or removing lift gas mass from the lift gas chamber. The balloon pressure control loop holds the balloon pressure to a commanded value of slightly positive gauge pressure by using an air blower and vent system to either add or remove air mass from the air chamber. Both of the control loops, lift and pressure, must be running for the system to operate in a decoupled mode.

The lift gas can be controlled with either an "open cycle" or a "closed cycle" which differ by whether the gas is retained or vented to the atmosphere once removed from the lift gas chamber. Both cycle types allow the lift gas mass to be controlled in the same manner, the only difference is whether power (open cycle) or mass (closed cycle) is consumed by the cycle. In the "closed cycle" design, vents allow lift gas from a compressed storage tank into the main lift gas chamber, while the system uses a compressor to pull the excess lift gas from the lift gas chamber and compress it back into the storage tank on the blimp. In the "open cycle" design, extra lift gas can be vented from compressed tanks on the blimp into the lift gas chamber to add lift gas mass and thus increase the buoyancy. Or the lift gas can be vented to the environment to reduce buoyancy.

"Single parameter coupled control" means the operation of a single control loop for buoyancy or lift force in which balloon pressure and lift force change in a coupled manner. This is the mode that occurs if the lift gas controller is turned off. Then the balloon pressure and net lift force are directly coupled. For instance, increasing the balloon pressure by adding air mass increases the net mass of the blimp which reduces the lift force. The preferred mode for lift control in the single parameter coupled control scenario is the use of an air blower and vents to add or remove air from the air chamber. This will act to add or remove mass from the balloon, considered as a roughly constant volume container. By blowing air into the balloon, the net mass increases and the pressure rises. The load layer in the skin of the balloon resists significant expansion, so the increase in mass substantially outweighs the increase in buoyancy due to any volume expansion. The balloon is kept at a slight positive gauge pressure, so that it is fully inflated at all times. The lift control acts by altering the scale of this gauge pressure. An increase in the gauge pressure due to added air will cause the system to fall. A decrease in the gauge pressure due to removed air will cause the system to rise. The air blower is controlled to maintain a target pressure in the air chamber, as the pressure is related to the net lift. A Non-limiting example of the base gauge pressure is 1 kPa with upper and lower pressure bounds of 0.5 to 1.5 kPa.

Most of the time, the balloon lift control system will run as a single parameter coupled control of lift and pressure. The lift gas chamber can generally be left at a set mass in non-emergency situations to provide a constant buoyant balance to the whole system, then the variable lift forces can be generated by modulating the pressurize in the air chamber. The single coupled control operate is simpler and less energy intensive than the dual decoupled control because of the pressure differential and the gas density. The pressure differential determines the difficulty of moving the gas from the low to the high pressure side, and this differential is only about 1 kPa for the air in the preferred mode, but can be upwards of 20 bar (2 MPa) in the preferred mode for the lift gas to bring it back into the compressed gas tank. Thus much more energy is required to move a given volume in the lift gas case. Second, the air density is always much higher than the lift gas, so gas transfer systems like blowers and compressors will be more effective at transferring mass by moving air around than moving lift gas.

The limit of the single parameter coupled control is when the situation deviates outside of normal conditions. In these cases, it may be necessary to independently control lift and balloon pressure. Because these conditions are the extreme circumstances, and thus the lift gas mass control will only rarely be used, the "open cycle" design is preferred for the lift gas controller to save on cost and mass. For instance, if the balloon exterior develops a tear, and can no longer maintain significant gauge pressure, then the single parameter coupled controller cannot bring the balloon on down. Or in high wind scenarios where the balloon pressure must be increased to maintain rigidity. In these cases, the lift control system can be shifted to the dual decoupled parameter mode where the lift gas mass is now being actively controlled.

The dual decoupled control system allows for control of the lift provided by the balloon based on the fact that hydrogen at nearly ambient pressures will generate a nearly constant lift force that is a multiple of its weight, regardless of the exterior pressure. This value is approximately 13× if the hydrogen is exactly at ambient pressure, but falls slightly to around 12× if the hydrogen is at 1 kPa gauge in the tropopause (due to a slight increase in the hydrogen density at increased pressure). This reduction in the buoyant force is due to the fact that the atmosphere pressure is around 5 kPa in the tropopause, but the hydrogen in the balloon is at 1 kPa higher (6 kPa) to ensure the balloon is rigidly inflated. The increase in pressure of the hydrogen raises its density slightly, lowering the resulting buoyant force per volume. Thus, lift gas mass roughly translates to lift force independent of altitude, assuming that the balloon gauge pressure is held constant. Extra lift gas is stored and supplied from a compressed tank. The air side of the balloon is used to control the pressure in the balloon. This pressure is passed to the lift gas chamber through the flexible diaphragm, and throughout the whole balloon.

Such a dual controlled system is a significant advantage in survivability and control over conventional single control systems, in the manner used for superpressure balloons. The dual control design enables independent control of the stress on the balloon skin as well as control of the lift force. The controlled interior pressure acts to rigidify the structure via pressure rather than material strength. This provides substantial weight and cost savings. Single coupled controllers have these linked, and thus suffer from changing rigidity and shape if they have to significantly change the buoyant force. While this works fine for small deviations (normal conditions), when extreme conditions are encountered, the single coupled controller systems are less robust. The dual control design guarantees the inflated structure remains at a safe and controlled inflation pressure during all operation, allowing it to be used as a consistently inflated body structure on which thrusters and solar panels may be mounted. This allows heavy, rigid interior structural elements to be replaced with reliable inflated structures that are much simpler, cheaper, and lighter.

The dual controlled system provides advantages of a fixed size for the overall balloon envelope, while allowing operation of the lifting gas envelope as a zero pressure, or near-zero pressure balloon. The configuration also allows the use of an expandable lifting gas envelope that operates without the use of an elastically expandable skin. Instead, the expansion and contraction of the lifting gas envelope is accommodated by change of shape of an inner envelope within the confines of an outer envelope.

The decoupled operation also provides several safety and operational benefits, which are important differentiators. These include, 1) allowing for continued transfer of lift gas into the balloon in the case of an inner lift-gas balloon leak, should the balloon need to maintain lift while trying to return to the station, 2) allowing for altitude control in the possible case of the outer air balloon leak, which for a single control balloon would result in loss of superpressure control which would mean the balloon could not built up any net weight to create a negative buoyancy required to descend in altitude, 3) allowing for the balloon net lift to be significantly raised, as in the case of attaching to another balloon and attempting to bring that down safely, 4) allowing the balloon net lift to be significantly lowered, as in the case of losing components or water payload, where such lift reduction is needed to bring the system home, 5) the load applied to the balloon skin can be contained within a small pressure range during the operation, so the safety factor is likewise nearly constant, 6) the gauge pressure can be controllably altered if needed during high winds or other unusual circumstances to rigidify the balloon, or to reduce pressure in the case of a known leak, and 7) the lift force can be altered over a greater scale of net lift than pressure control only. For all of these reasons, the decoupled operation provides substantially more control and safety to the system. It should be noted that these extra benefits are mainly emergency circumstances, so the "open cycle" design is considered to be sufficient.

The air chamber pressure controller is particularly useful when the balloon is changing altitude, as the air should be rapidly pumped in/vented to maintain constant gauge pressure. Gauge pressure is the parameter of interest for determining the stress in the balloon fabric. The absolute atmospheric pressure is rapidly changing with the altitude and so too is the lift gas density. In conventional overpressure balloons, the balloon fabric stress will rise with altitude as the gauge pressure continues to build. This means the balloon fabric must be significantly overdesigned for most operational conditions. In the proposed design, the air chamber controller will simply vent air to hold to the balloon at a roughly constant gauge pressure and allow the lift gas to occupy an ever greater fraction of the total balloon volume until the balloon reaches operational altitude. The reverse occurs when the balloon descends. Lift gas is pumped back into the tank to reduce buoyancy, and the air chamber controller compensates by pumping in more air to maintain the gauge pressure. The net effect is that more air is pulled into the constant volume of the balloon, increasing its mass when considered as a control volume. The balloon buoyancy drops, generally causing the balloon to sink. The lift gas volume will fall as the absolute environmental pressure rises. The air chamber pressure controller pumps air into the air chamber to maintain the gauge pressure, counteracting the reduction in lift gas volume. At ground level, the balloon will be mostly (>90%) air for a tropopause capable system. The lift force does not substantially change during this operation for a given amount of hydrogen in the balloon, nor will the gauge pressure that the balloon skin must resist.

The lift gas control will generally be a slower, more power demanding operation than air chamber pressure control. In essence, the air pressure system provides the immediate change in buoyant force; then is slowly switched out for buoyant force generated by a changed amount of lift gas mass so that the balloon pressure can be brought back to the initial baseline value. In the dual parameter decoupled control mode, the slow response of the lift gas control system could be aided by having the air pressure controller immediately start driving air in/out to generate a lift force change as well as a pressure change. This pressure change would be held within the upper and lower pressure bounds determined by material safety criteria. The air pressure controller would now have generated a rapid lift force change. The lift gas mass controller would be running through this time, slowly adding/removing lift gas mass. As the slower lift gas mass change continues to build, the air pressure controller can begin to bring the balloon pressure back to the baseline term, ensuring that the net buoyant force is held to a constant value.

This allows the controller to respond much faster by using the pressure modulation control as the rapid response, but using the hydrogen mass as the slower, larger scale response. The upper and lower bounds on the pressure command ensure no damage is done to the material by the high frequency pressure variation.

Balloon-to-Keel Tethers

Figure 4A:
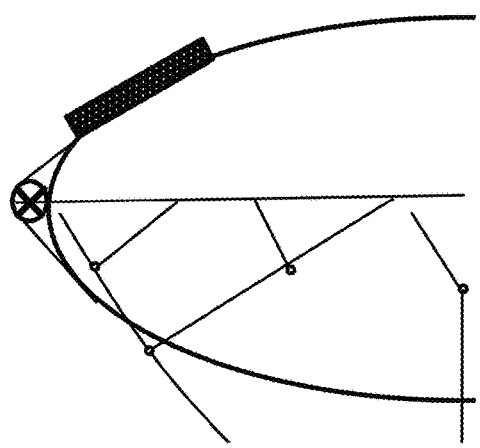
FIGS. 4A-4C are schematic diagrams of the balloon-to-externally carried section tethers, showing half of the system (FIG. 4A), the tethers alone (FIG. 4B), and according to changes in the balloon orientation, as is shown in (FIG. 4C).
Figure 4B:
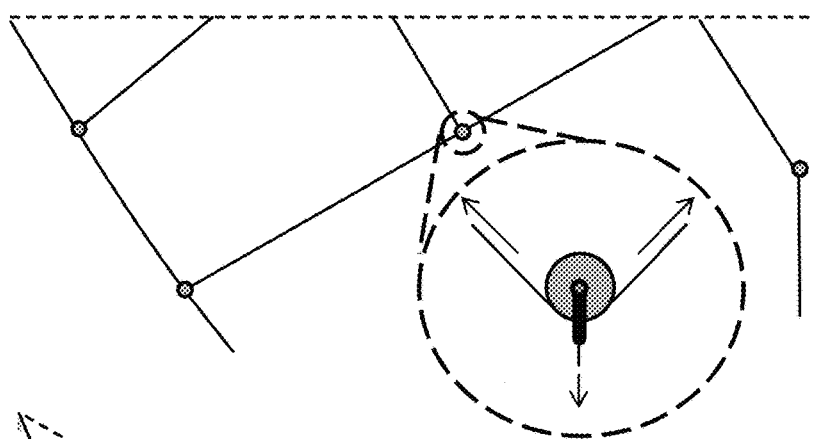
Figure 4C:
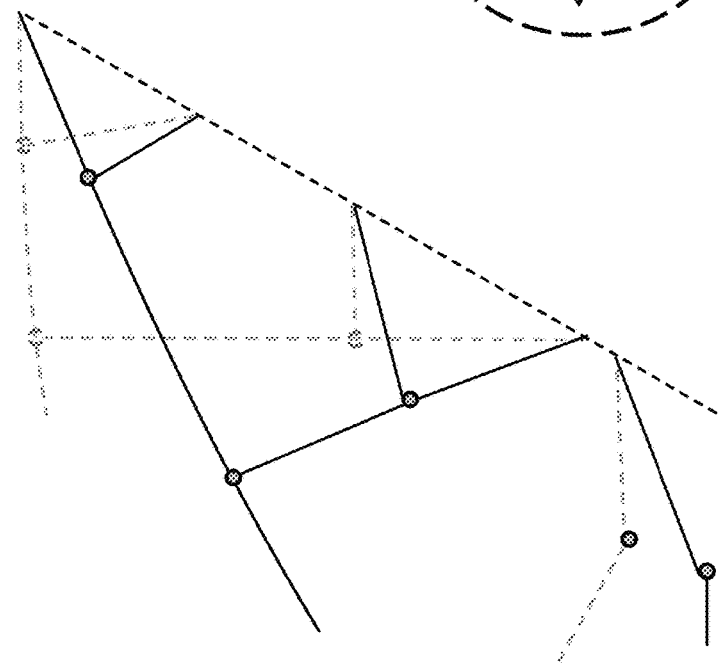

The balloon is attached to a payload, referred to as the keel, via a set of tethers which allow the balloon (the balloon envelope) to rotate. FIGS. 4A-4C are schematic diagrams of the balloon-to-externally carried section tethers, showing half of the system (FIG. 4A), the tethers alone (FIG. 4B), with a focus on one tether line joint. The main tether branches out as it rises from the keel, splitting into many smaller tethers in order to main contact at many points on the balloon. This structure needs to be able to adapt to changes in the balloon orientation, as is shown in (FIG. 4C). The diagrams show the effect of the pulleys on reordering the shape of the tether branching mesh, without reordering the topology of the branching mesh. The topology is that of a Y-branch at each intersection, with a main tension line splitting into two lines when following the tether from the keel to the balloon. This structure is maintained, but the relative length of the two arms of the Y at each branch (the shape) changes depending on the balloon orientation.

The balloon is attached to the keel via tethers, which can form a branching pattern. There are two main cables which hang below the balloon and attach at the front and rear of the long axis of the elliptical balloon, on their respective side, forming a branching pattern at each end. The branching pattern is formed not with knots at the joints but with pulley-like bearings, so the system can adapt to different load angles as the balloon changes pointing direction, as shown in FIG. 4C. Additionally, the use of movable joints permits the outer envelope to distort without being stressed by the tethers.

The tethers may, by way of non-limiting example, be wrapped fully around the pulley, producing a 360°+ contact line, as this would avoid issues with the cables falling off the pulleys should the tension be released at any point. The two main cables are largely parallel. They both pass through a movable cable clamp on the keel, which allows the keel to move along the main cables. This is presently envisioned as a capstan effect design, where the cable is wrapped around a rotational axle, which can be rotated to move the externally carried section along the line. Thus as seen from above (down the y axis), the cables form an approximate X with the keel at the intersection.

Figure 5C:
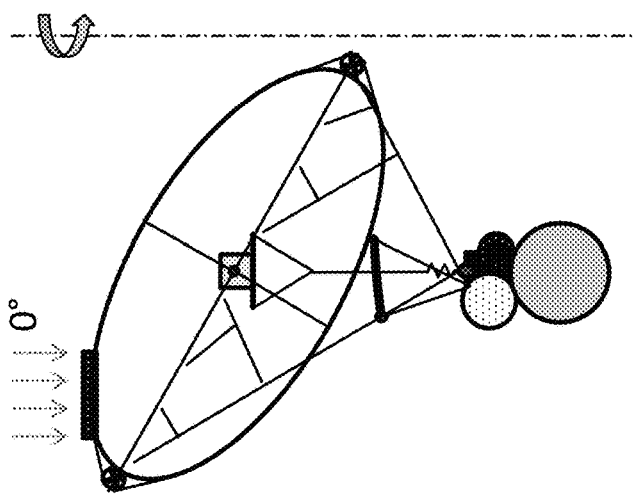
FIGS. 5A-5C are a series of schematic diagrams depicting the airborne floating solar energy facility in side view, tracking the sunlight from the horizon to vertical by changing the angle of the balloon.
Figure 5B:
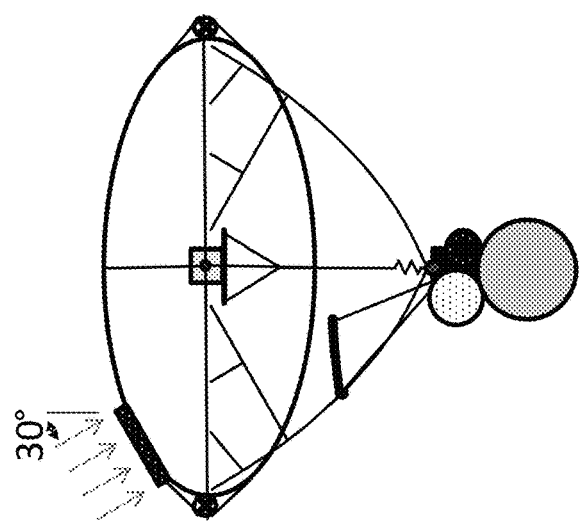
Figure 5A:
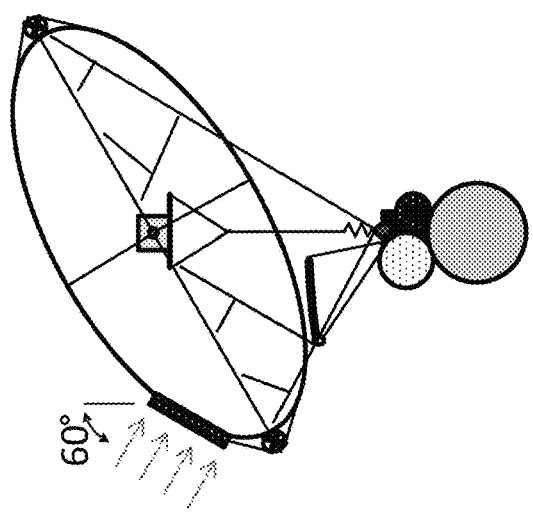

Another tether may, by way of non-limiting example, connect the x-direction thrusters to the keel, pointing approximately down at all times as the keel will always hang directly below the balloon. FIGS. 5A-5C are a series of schematic diagrams depicting the airborne floating solar energy facility in side view, tracking the sunlight from the horizon to vertical by changing the angle of the balloon. After noon the sun starts to set, and the solar energy facility flips 180° in θ−z, and again uses the angle change to track to the opposite horizon, as will be explained with respect to solar energy capture.

These x-direction thrusters are on one-axis gimbals, so they can stay horizontal even when the balloon rotates around the y-axis as shown in FIGS. 5A-5C. The vertical tether connected to the x-direction thrusters is best designed as a Y, connecting to the thruster at two locations, and these two lines meeting some distance down below the thruster. This generates a strong moment on the thruster to level it. It also allows vertical tension lines to be placed from the thruster compression bar straight down, passing through the arms of the Y. The balloon is able to change its angle; however, this tether is always vertical owing to the tank location being held by gravity to be downward. This tether may be made slightly elastic via the addition of a stretchable element (for instance, a spring), with a hard length limited to set the max elastic limit, as this thruster-to-externally carried section distance changes to a lesser degree with the angle of the balloon. This vertical tether is able to carry some lift from the balloon as well as maintaining the thruster horizontally.

All of these tethers—the two main lines and the two vertical tethers—could be set as doubles for additional safety, meaning that two redundant tethers are used in each line, and two pulleys are used in each joint. This ensures that the loss of any one line section does not cause the whole branch network to fall apart. This could be easily visually monitored both in the air and during the refueling step, to institute repairs whenever a damaged section is observed. The main vertical tether will also be designed to keep the externally carried section largely horizontal should one of the sides of the two main tethers be damaged. This will allow the system to use the paragliding wing and thrusters to controllably return to the station.

Wings

Figure 6B:
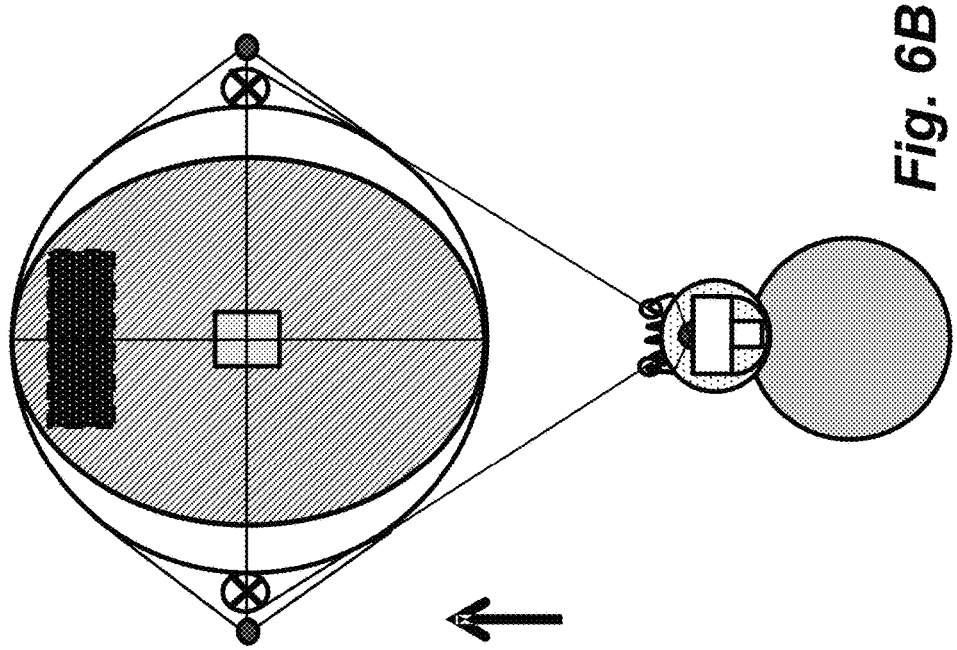
FIGS. 6A and 6B are schematic diagrams showing a wing seen from the front of the platform, unfurled and being used for steering (FIG. 6A), and the wing pulled in tight and cinched down (FIG. 6B).
Figure 6A:
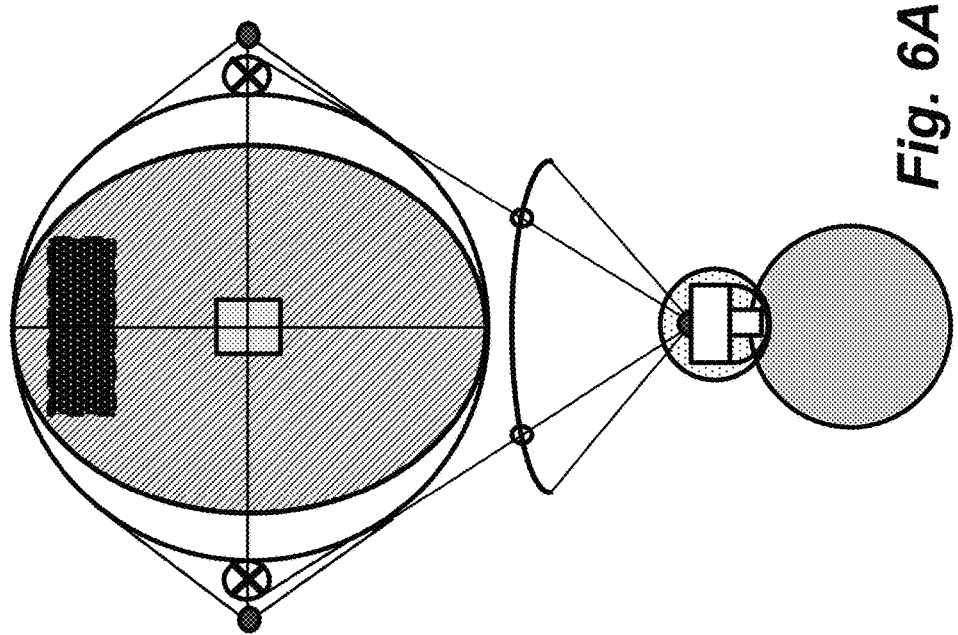

FIGS. 6A and 6B are schematic diagrams showing a wing seen from the front of the platform, unfurled and being used for steering (FIG. 6A), and the wing pulled in tight and cinched down (FIG. 6B). A single wing-like structure can be attached to the main tethers below the balloon, and controlled by motors on the externally carried section. The purpose of the wing is twofold, to provide fine control during descent for the airborne floating solar energy facility, and to guide the keel after emergency detachment.

The wing may be structured like a paragliding wing which inflates to a semi-rigid airfoil shape via wind flow into and over the wing. The wing is held in place via two mechanisms. The first mechanism, tether bearings, anchors the wing from moving around in the x-y plane, out from under the balloon. The second mechanism, tension lines, control the angle and twist on the wing, as well as pulling it in or releasing it to spread wide.

There are several possible methods to design the wings, with the major variation being the first mechanism, the tether bearings. As one example, for a rearward tail fin design the first mechanism is composed of linear bearings, such as rings, at two locations on the trailing edge of the wing. These locations may either be the trailing two corners of the wing or may be symmetrically located (along the center-line of the craft) but shifted in towards the center of the wing. These linear bearings are allowed to slide along the rear-two main cable tethers linking the balloon to the externally carried section. This first mechanism (tether bearings) may not be required, as the paragliding wing can be released and operated under the balloon without direct connection to the main guide tethers. The difficulty with the untethered version is ensuring that the wing can be tightly bunched up after use to avoid wind gusts from catching on the wing and causing unexpected dynamics. By way of non-limiting example, the wing is attached to the main tethers and/or balloon using another set of lines or bearings, but several designs are possible. A possible layout for a rigid-wing design includes running two parallel cables from front to back, with both ends of the cable attached midway between the main cable's balloon and tank attachment locations. The wing is then attached to these two parallel lines so it cannot be shifted in the x-axis, can be pulled a small amount in the y-axis, and can be easily warped to generate θ-x axis torque or angled to generate lift. This design may use rigid bars (or multi-segmented rigid bars) along the leading and trailing edge of the wing, which by default holds the wing flat and level. The parallel lines would be attached to the rigid bars. This immobile attachment location method means the wing angle of attack is set by the balloon orientation angle, and so to change lift, the whole balloon would be rotated. This design will have difficulty detaching in an emergency as noted below.

As it stands, the balloon will act as a moderately good wing, so the major use for the wing is steering rather than lift. This leads the design to focus on the rear-ward attachment method, which is simple but would have difficulty due to unbalancing the system if generating large lifts. In an emergency, the main balloon-tank tethers can be cut, allowing the tank to fall away from the balloon. The wing will remain connected to and controlled by the tank, becoming a parachute to control the fall and guide the landing of the tank.

The wing is attached via bearings to the back two main cables, still under the balloon but in the rear of that area. The two bearings allow the wing structure to change θ-x, θ-y orientation, or even be pulled in, but not to move sideways or blow away. The rearward location of the wing holds it above but behind the main weight, the externally carried section. This means that during descent, if the wing is used to generate lift, it will generate a torque around the x-axis of the system. This should not be an issue, as the drag on the balloon does likewise and would partially counter this effect, and then the externally carried section location would shift relative to the balloon lift vector, fully balancing out the torque. The net result would be a slight angling downward of the balloon to achieve equilibrium, which may be fixed by rotating the balloon around the x axis.

The second mechanism of wing control (tension lines) is composed of at least two but generally four sets of tension lines running from actuators on the keel out to the edges of the wing. These are controllably differentially released or drawn in to drive at minimum two, but generally four possible motions, requiring at least equal numbers of independent actuators. The four possible motions are the 1) θ-y (can be ignored as lift generation can be done by the balloon), 2) θ-x orientation (of limited use), 3) warp of the wing in order to steer the airborne floating solar energy facility, or 4) pull-in. The final mode is where the tension lines can all be simultaneously be pulled in to force all the corners of the wing to slide along the main lines towards the center and the externally carried section, essentially forcing the folding up the wing. A fifth actuator can be attached to a line that passes through a number of sliding bearings (for example, rings) along the edges of the wing, and when this is drawn in, it cinches down the wing down to the externally carried section so it cannot catch the wind. This is referred to as "pulling in" the wing, as shown in FIG. 6B, and reduces problems with wind drag during periods of geo stationary operation.

Solar Energy Capture

Solar radiation is captured via photovoltaic (PV) solar panel elements attached to the upper surface of the balloon forming a photovoltaic array (PV array). The PV array provides electricity to an electro-chemical cell, which is mounted in the keel. The solar elements transfer the solar energy to the electro-chemical cell and to the platform for operation. The excess heat generated as waste by the solar capture elements may also be captured via thermal-energy transfer systems, and turned into usable energy for use on the solar energy facility or for storage in the electro-chemical cell.

The PV solar panel elements can take different forms, which include, by way of non-limiting examples, crystalline or multi-crystalline photovoltaic cells, thin-film photovoltaic cells and other types of photovoltaic collectors. Concentrated PV systems, such as inflatable concentrators with low mass may also be useful for increasing the power to mass ratio. These are known to operate at higher efficiencies under intense sunlight. Should alternative solar energy capture technology be developed, the PV units may be replaced without materially affecting the design.

In one non-limiting example mode, the airborne floating solar energy facility has "hard point" attachments, to which are mounted one or more PV arrays. The PV arrays may be, by way of non-limiting example, conventional, rigid, small (less than 1 m$^2$) crystalline or multi-crystalline photovoltaic cells laminated between flexible sheets.

In another non-limiting example mode, the solar energy facility has a series of flexible thin-film photovoltaic cells forming the photovoltaic collector array mounted either to hard point attachments or directly to the balloon's outer envelope, providing electricity to the electro-chemical cell. These solar arrays are also flexible and so will not generate significant stress concentrations on the inflated balloon surface.

The keel tethers are used to shift the balloon so that the photovoltaic collector array is optimally aligned with the sun. In one non-limiting example, the mounting of the photovoltaic collector array centers the photovoltaic collector array at close to 45° from the top position in a manner to configure the airborne floating energy facility to achieve the optimal position with respect to the sun with a minimized range of tilting of the airborne floating energy facility. There are other configurations which are possible, such as having the photovoltaic collector array at close to 30°, or at another angle. Given that the incidence of solar energy will not fall significantly below 90°, there are practical reasons to configure the externally carried section tethers and the photovoltaic collector array at a location higher than 45° from the top position.

In another non-limiting example, the photovoltaic collector array is configured so that portions of the photovoltaic collector array are separate from the fabric of the outer envelope. Other configurations have the photovoltaic cells aligned in a common direction, so that some of the photovoltaic cells receive light normal to the surface of the outer envelope below the cell, but cells closer to the top or further from the top are angled relative to the balloon skin to receive light in a common direction. In other words, the photovoltaic cells in the photovoltaic collector array are configured to receive optimally light in a common direction.

The energy capture elements (PV solar panels in one non-limiting example mode) should be pointed at the sun for the best efficiency conversion. This requires tracking the sun from the horizon, up to its zenith and back to the opposite horizon. As shown in FIGS. 5A-5C, tracking the sunlight from the horizon to vertical is achieved by changing the angle of the balloon. After noon the sun starts to set, and the solar energy facility flips 180° in θ-z, and again uses the angle change to track back down to the opposite horizon.

Given the arbitrary orientation of the balloon, a simple solution to tracking can be found in flipping the balloon orientation 180° around an axis normal to the earth's surface when the sun is at its zenith, and following the sun back down to the horizon. This rotation and the correct orientation are effected by the thrust units attached to the balloon. This reduces the required tracking motion from ±90° rotation as used in a grounded system down to only 0 to 90° rotation.

The required range is thus halved. While the standard design plan as conventionally suggested would call for placing the solar panels at the top of the balloon, this requires the largest rotation of the balloon to track the sun down to near the horizon, 90°. Large rotations may be problematic for the design as they require significant distortion of the balloon and complex extra tethering. It is instead advantageous to have a smaller amount of rotation which is split to occur in both directions. The solar panels can be placed at 45° down the side of the balloon, reducing the needed rotation to only ±45°. The range can be cut yet further by accepting a slight loss of solar power while the sun is at the horizon. For instance, if the solar panels are at approximately 30° off vertical, and the balloon is designed to rotate by approximately ±30°, then the solar panels only see approximately 13% energy reduction while the sun is at the horizon. In one non-limiting example mode, the balloon is tuned for the 30° off vertical concept, as shown in FIGS. 5A-5C. The tradeoff is a few percent of the possibly daily energy capture vs the mechanical design needed for large balloon angle rotations. The 30° off-axis with ±30° rotation concept is able to capture about 98.5% of what is possible with the full 90° rotation. This is because the non-normal irradiation only occurs for a short period during the day, and only for relatively small angles off-normal. The gain is that the balloon distortion at ±30° is a significant reduction from ±45°, exposing significantly less cross sectional area to wind, and reducing the variation in the load path angle that the main keel tether line must handle.

The main rotation of the balloon occurs around the y-axis, which is transverse to the long axis of the balloon. Most designs operate by rotating mainly or only around the x-axis, the long axis of the balloon. This has the unintended consequence in the tropopause of forcing the balloon to point its long axis north-south, which is perpendicular to the general direction of the prevailing winds (east-west). This issue has not been generally noted by other high-altitude platform designers, leading previous designs to focus on x-axis rotation for solar tracking. When the rotational axis is transverse to the long axis, the balloon can "point" into the wind (east-west) while simultaneously tracking the sun. This significantly reduces the average drag both due to the aerodynamic shape and the reduced cross-section. The balloon can be rotated by driving the keel along the two main tethers slung below the balloon, changing the center of mass and thus the equilibrium rotation of the structure.

A secondary rotation around the θ-x axis may also be implemented via the same general mechanism that drives the primary θ-y rotation. The two Degree-of-Freedom (DOF) rotation capability would provide more operational flexibility for the system in high wind scenarios. These scenarios require that the balloon balance between pointing into the wind and pointing the solar panels at the sun. A one-DOF θ-y system is able to efficiently track the sun and face into east-west winds, but it would compromise on either wind resistance or solar capture for north-south winds. A 2-DOF capability provides a second DOF, that of θ-x that allows the balloon to efficiently track the sun while facing into north-south winds. The combined system gives the most flexibility for handling both solar tracking and wind resistance mitigation.

The mechanism by which this two-DOF rotation could be enabled is a set of four motors and spindles on the main keel mass, where each motor/spindle set is responsible for setting the tether length of one of the four lines coming down to the keel from the balloon. The keel can be driven in the x axis direction (and thus force +θ-y rotation) via synchronized motion of the four motors, rolling in tether on the two motors on the +x side and releasing tether on the two motors on the −x side. The keel may be driven in the y axis direction (and thus force +θ−x rotation) via synchronized motion of the four motors, rolling in tether on the two motors on the −y side and releasing tether on the two motors on the +y side.

This rotation control mechanism provides one more DOF that may be useful during flight, that of synchronized intake or release of the tethers on all four spindles, resulting in z axis motion. The release of the tethers would provide a means to do the emergency separation between externally carried section and balloon. The uptake may have some utility for stability of the floating solar energy facility during landing.

The solar energy capture elements will generally need to dispense with waste heat. In the case of one non-limiting example method of PV solar panels, these panels are more efficient at lower temperature, so there is a benefit to finding an effective cooling technique for the solar panels. Radiative heat transfer as well as natural and forced convection will all help dissipate the waste heat.

Forced convection over the solar panels is a promising method; however, if the solar panels are directly glued to the surface then the forced convection can only act on one side of the solar panels, which halves its utility. By raising the solar energy capture elements slightly above the surface, perhaps on the order of a few cm, a channel can be created between the underside of the energy capture elements (PV solar panels in one non-limiting example mode) and balloon surface. The energy capture elements should be anchored to the balloon via a mounting structure which allows air flow to pass in any direction, given that the direction of air flow may change through the day. A good example of this would be an array of posts. A raised lip may be placed around the edges of the solar panel array which would serve to capture and slightly compress the air flow, forcing it to flow faster than the standard balloon-skin surface air flow. This would be a further amplification over the far-field air flow, as the air is forced to move more quickly to get over and around the balloon. Such omnidirectional air-flow with amplification will help drive the solar energy capture element temperature down to the ambient air temperature, as desired. The structure will have the additional benefit of decoupling the solar panels from the balloon skin, protecting the balloon skin from damage and the capture elements from thermal expansion/contraction incompatibility issues. The mounting will also make it easier to repair or replace the solar energy capture elements. Finally the mounting has the potential to be used as a heat sink for the solar panels by proper selection of shape, material and interface. This could potentially significantly increase the solar panel's ability to dissipate heat to the air running between the solar panels and balloon surface.

Energy Storage

The hydrogen approach envisioned design of the energy storage refers to a structure made up of one or more tanks. These tanks include i) one tank for each of the low energy precursor chemical(s) used for making the high energy fuel, and ii) one tank for each of the resulting high energy fuel chemical(s) produced by the electro-chemical cell when in energy storage mode. These fuels are storing chemical potential energy which can be released as needed to provide energy, acting as a supply for power when the solar panels are insufficient. The chemical potential energy may be in the form of a battery or in the form of chemically separated gases such as hydrogen and oxygen generated from water electrolysis, among other techniques. The majority of the stored energy is supplied to the ground station upon return to the ground, thus passing off the energy captured by the platform in any of several ways including i) transfer of the energy via electrical means, ii) transfer of the high-energy fuel chemicals, or iii) transfer of the tanks containing the high-energy fuel chemicals to be replaced by empty tanks.

In one non-limiting example mode, the energy storage system is implemented using three separate tanks—one for water, one for hydrogen and one for oxygen. The hydrogen and oxygen tanks may be type III pressure vessels (metal liner with fully wrapped composite) attached to the balloon from below by tethers. The metal (for example aluminum) liner reduces hydrogen permeability while the composite (for example carbon-fiber) acts as the load bearing component. A layer between the barrier and load layer may act as a self-healing material to plug cracks by solidifying upon contact with air or hydrogen, but otherwise wicking into small gaps. It is alternately possible to use one of the fuel chemical tanks, e.g., the hydrogen tank, to store the water.

In one configuration, all of the chemicals which pass into the electro-chemical cell and come out of it are stored on the airborne floating solar energy facility. It is advantageous that all of the chemicals which pass into the electro-chemical cell and come out of it are stored on the airborne floating solar energy facility, so there is no change in system mass caused by the chemical energy storage operation. This mitigates buoyancy variations. Variations in buoyancy of this sort generally require increased capability for lift gas storage, or increased balloon fabric gauge pressure, increasing system weight and likelihood of failure. Additionally, the generated chemicals are often valuable commodities, so storing them provides a financial benefit too. In one non-limiting example mode, holding onto the oxygen keeps the floating solar energy facility mass constant and provides either a fuel improvement or a source of revenue.

In an alternate example, water may be collected in the troposphere as the floating solar energy facility rises. This would have an advantage if there is a reason not to carry water as a precursor from the ground, for example if the high energy fuel were discharged prior to landing the floating solar energy facility. Alternatively, if the floating solar energy facility remains within the troposphere, moisture can continuously be collected. If extraction of moisture requires refrigeration, this would reduce the efficiency of energy conversion, but may allow an increase in the total amount of high energy fuel extracted.

In one non-limiting example mode, the first and smallest tank contains the water to be converted to hydrogen and the electrolysis unit. The chamber containing water should be kept above freezing, or at least brought above freezing when the electrolysis unit is ready to operate in order to maintain liquid water for the electrolysis unit. The water could be maintained at temperature via a small heating unit and sufficient insulation. The oxygen produced by the electrolysis unit is conveyed to the oxygen tank. The hydrogen produced by the electrolysis unit is conveyed to the hydrogen tank.

The pressure generated in the fuel tanks should be kept largely equal, so that there is not a significant pressure differential between the two sides of the electro-chemical cell. This simplifies operation and minimizes diffusion, particularly in the case of one non-limiting example mode of hydrogen generation via electrolysis. The pressure can also be communicated to the precursor (water) tank via a fluidic connection, so that either or both of the gasses pressurize the precursor chemical (water) and thus avoid the need for pressurizing pumps. In one non-limiting example mode, the gases may be kept separate from the water by a flexible membrane which passes the pressure for equilibration, but does not allow diffusion of the gas into the water. Such a setup ensures all chemicals—precursor and fuel—are at roughly equal pressures, which reduces the need for heavy and expensive pumping equipment. Any fuel chemicals in the precursor tank would be driven out when the precursor tank is refilled at the ground station, thus ensuring complete recapture of the fuel chemicals.

The hydrogen chamber does not require heating and in fact benefits from the cold temperatures at altitude as this enables near cryogenic hydrogen storage with an associated increase in gas density. The hydrogen tank can be wrapped in insulation so that it stays as cold as possible, close to the $-60°$ C. typical of the tropopause. This increases the storage density of the hydrogen both at altitude and when the solar energy facilities return to the station. The solar energy facilities are descending for approximately an hour, at low altitude for a short time (<0.5 hr) for the material transfer, and then ascending for approximately another hour, meaning that the insulation only needs to keep the temperature low for a limited period of time before the hydrogen is drained and replaced with water. The excess heat generated by the electrolysis unit is stored in the water to aid in overnight warming or dissipated via external heat fins. Thermal-energy conversion devices such as thermoelectric materials or Stirling engines can be used to recapture some of this waste heat and turn it into usable power to improve the overall system efficiency. The two chamber system keeps the hydrogen pure so that it is suitable for distribution and also reduces explosion risk since there is no oxygen entering the hydrogen section of the tank.

The water tank can be surrounded by an insulation layer of air, which will help reduce the power required to keep the water liquid during periods of no access to solar power. This may be done by the use of closed cell insulation, which is pressurized such that it achieves full volume only at maximum altitude. Closed cell insulation would be lightweight, low cost and would provide high thermal resistance due to the use of air as the insulation. The water may be used as a thermal capacitor to keep the electronics and other sensitive equipment within operational temperature bands overnight. This can be tuned via the thermal insulation.

Figure 7:
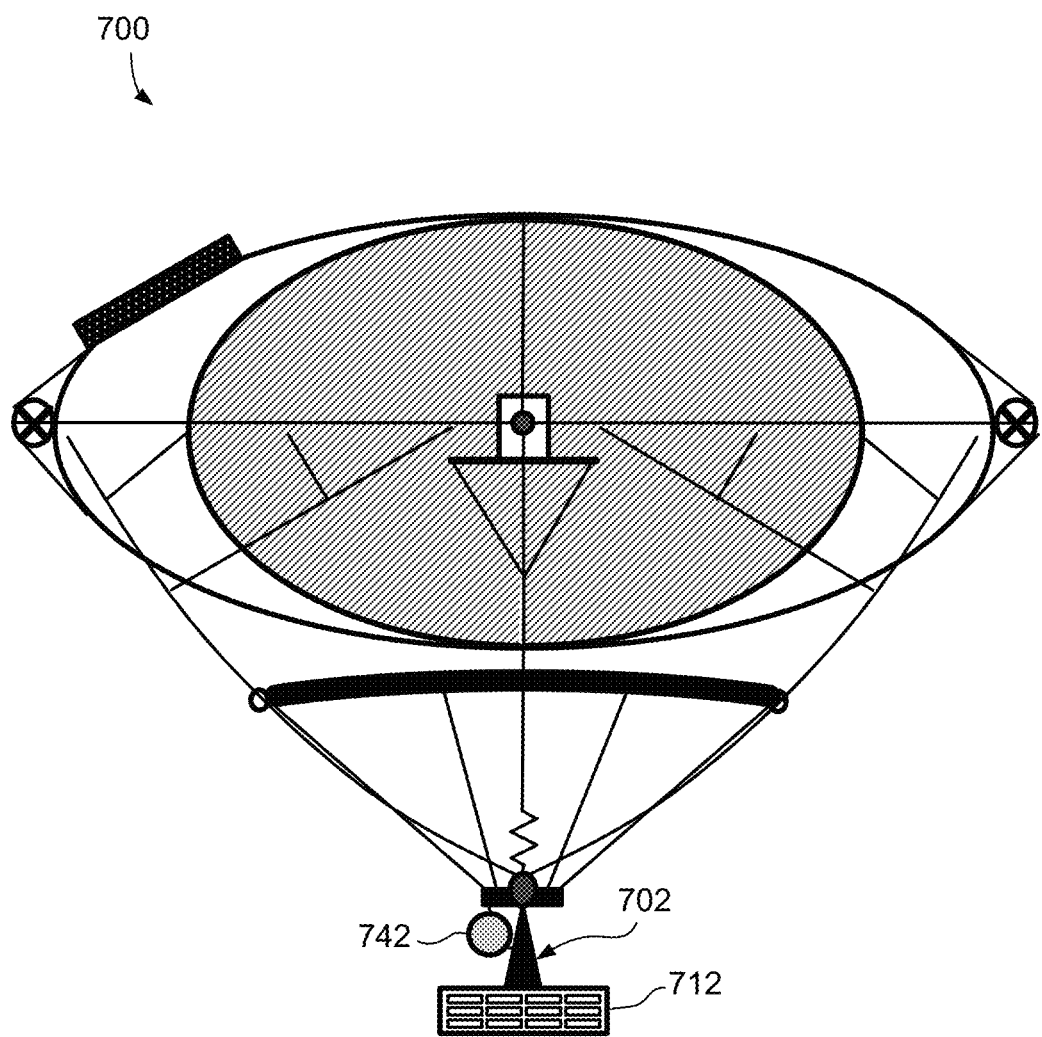
FIG. 7 is a diagram showing the use of battery energy storage

In the battery example of energy storage the electricity from the solar energy capture system is used to charge batteries. A depiction of this configuration is shown in FIG. 7, in which an airborne floating solar energy facility 700 has a keel section 702, which includes a battery carrier 712. In addition to carrying batteries, airborne floating solar energy facility 700 can be configured to carry and produce high energy fuel or lift gas, which can be stored in storage tank 742.

The system as depicted in FIG. 7 can also function with inertial masses in lieu of batteries, with the storage units representing the inertial masses.

Balloon Gas Compression

In a non-limiting configuration, at least two compression units are used in the design. The first compressor transfers lift gas between the balloon and the lift gas storage tank, if used in the closed-cycle design noted earlier. This first compressor is used to control the mass of lift gas in the balloon, all of which is generally at a constant overpressure of around 1 kPa, to the environment. This results in the hydrogen providing a nearly constant lift per mass largely independent of altitude and temperature. The second compressor, specifically an air blower, drives ambient air from the surrounding environment into the atmospheric diaphragm of the main balloon. This air blower is used to control the pressure of the main balloon to the targeted overpressure value which directly determines the stress in the balloon fabric. At high pressures the balloon acts as a rigid structure, which is crucial for supporting the solar energy collection elements and forming a robust aerodynamic structure; however, if the pressure is too high the skin will be damaged. By actively controlling pressure to a safe value (or even raising it temporarily during specific events like high winds) the balloon design can safely navigate the balance to gain the advantages of the lightweight inflated-rigid structure without risking damage to the balloon skin.

The lift gas tank (holding hydrogen in one non-limiting example mode) is pressurized to the scale of 20-100 bar in the example mode, a value known to be within the bounds for the direct output of the electrolysis unit (the electrochemical cell of the example mode) to operate at high efficiency. The tank mass can be shown to be approximately constant, independent of pressure, suggesting that there are not significant mass savings to be had by further pressurizing the gas. Instead, this higher pressure simply requires more equipment and power to drive the hydrogen. The 20 bar scale can be generated without any special compression equipment after the electrolysis unit, and so it serves as a convenient upper bound for the tank pressure from a viewpoint of simplicity. The hydrogen compressor is used to control the amount of hydrogen in the balloon, which is directly proportional to the lift force generated by the balloon (via the balloon design described previously). In the example mode, the hydrogen tank thus serves dual purpose as 1) a storage for the chemical fuel generated by electrolysis and 2) as the necessary third or additional compartment for the lift control mechanism.

The hydrogen compressor can be of a design that can be used to recapture energy when allowing the gas to leave the tank. A double acting piston displacement pump would be able to control flow into or out of the tank. Gas leaving the tank can be used to run the pump motor as a generator, recapturing a fraction of the energy. This reversible operation is expected to capture approximately 30% of the energy invested in compressing the hydrogen.

The second compressor, an air blower, is used to drive gas from the ambient atmosphere into the atmosphere diaphragm in the main balloon, and is used to keep the balloon effectively rigid. The air compartment would be maintained at a slightly higher pressure (with present target value ≈1 kPa) than the surrounding atmosphere. A high flow, low pressure air blower should be used for this operation. The hydrogen in the balloon will reduce in volume as the balloon descends, so the air chamber should be inflated to maintain consistent balloon pressure. The hydrogen in the balloon will increase in volume as the balloon ascends, so the atmospheric diaphragm would be vented to the environment to maintain consistent balloon pressure. This air blower may be an independent element or may be built in as an auxiliary load driven by the thrusters or primary compressor motor. Flow rate estimates for the power draw of the primary lift gas compressor vs. the air compressor suggest that the air compressor will only draw a few percent of the energy of the lift gas compressor, and so could be added as an auxiliary load draw on the lift gas compressor, meaning that for rapid pressure changes, the whole power of the lift gas compressor can be driven into the "air" compressor for short periods.

Electro-Chemical Cell

In the hydrogen approach, an electro-chemical cell is used to extract the energy provided by the solar energy capture elements for storage in the form of a high energy fuel, which in the non-limiting example is hydrogen. This is done by drawing in low energy chemical(s), adding energy by splitting or combining, and storing the resulting chemical(s) as a form of chemical potential energy. A non-limiting example mode for this is an electrolysis unit, used to chemically break apart the water into its constituent elements. A wide range of electrolysis technologies can be used; however, the two most mature are PEM and Alkaline. The example mode utilizes a PEM unit as it is well suited for this design due to its i) compact size and weight, and ii) can easily keep the gases separated, which aids in the purity of the product. The unit is attached to or within the water tank. The hydrogen output is directed to the hydrogen portion of the tank. The oxygen output is directed to the oxygen container.

The low temperature of the surrounding environment can be used to aid in the process of purifying and drying the generated gases. As compared to grounded systems, the low temperature environment at altitude provides an easy means to help the purification. An environmentally aided purification techniques such as a cold trap can reduce power draw, gas loss, system cost and weight. This is a non-intuitive opportunity specifically created by the high altitude and cannot be exploited by grounded systems. Typical system design would call for a heavy, expensive and lossy dryer/cooling unit. The example mode of such environmentally aided purification is a three step process.

The first step is the flow of the hot, humid high-energy fuel gases (hydrogen and oxygen) through a series of cold channels which are held at low temperature but above freezing by controlled thermal interaction with the cold atmosphere. This low temperature tubing will act to dehumidify the gas, and condense the moisture onto the channel surfaces, where it can flow back to the electrolysis unit. The channels should be held above freezing to avoid generating an ice buildup which clogs the channels. These channels are also intended to cool the gas to near 0° C.

The second step is carried out on the resulting gas flow from the first step. The cool, dryer gases are run through multiple sub-freezing cold traps. These traps are maintained at their temperature by controlled thermal interaction with the cold environment. The cold traps condense the remaining moisture and other contaminants onto the sidewalls of the trap. When the traps are full, such that the condensate is beginning to significantly impede further gas flow, valves can be used to block the entrance and exit of the "full" trap and it can be heated up until the condensed moisture and contaminants are liquefied/vaporized. The liquid can be drained back to the electrolysis unit, to ensure the whole cycle is closed and no chemicals are exchanged (in or out) with the external environment. On rare occasions, the trap can be drained to the environment if needed, and purged with process gas once brought back online. Once drained, the trap would be re-cooled to pull all remaining unwanted impurities again to a condensed state, and then the valves would be reopened to restart the main gas cleaning process. Multiple cold traps in parallel would allow the system to continue to operate while one or more is out during the cleaning process.

The third step is carried out by exploiting the low temperature of the storage tanks, which are designed to equilibrate down to the environmental temperature in order to help pack the gas more tightly into the tank. Such tanks are at significantly sub-zero temperature, so will act like large cold traps. They will build up impurities on their walls and clean the gas further. The tank will stay at the low temperature upon return to the ground due to the insulation, so the impurities will remain condensed. The tank may be deliberately heated, as during maintenance, and the impurities could be drained out the base of the tank, or blown out in a fashion similar to water traps for compressed air lines.

Thermal-energy conversion devices such as thermoelectric materials or Stirling engines can be used to recapture some of the waste heat generated in the electrolysis process and turn it into power to improve the overall system efficiency. The stored high energy chemical fuel (hydrogen and oxygen in the example mode) can be used to run the electro-chemical cell (electrolysis unit in the example mode) backward to supply backup power during night, landing or emergency situations. Since the reverse power draw is generally only a small fraction (about 5% of the forward power flow), the reversible electro-chemical cell is able to generally run at higher efficiencies. In the example mode, the electrolysis unit is able to operate at much lower current densities in the reverse fuel cell state than in the forward electrolysis state. Alternately, a separate electro-chemical cell specifically designed for reverse operation could be used. For the hydrogen, electrolysis system, this would be a fuel cell.

In the battery approach, an electro-chemical cell is used to store the energy provided by the solar energy capture elements for storage by charging batteries.

Control Electronics

The electronics unit, including a GPS system, is the control nexus of the system, and is the active controller of the solar energy facility location including communicating with nearby solar energy facilities, monitoring and controlling the pressure within the balloon, monitoring the operations and status of all components, checking for errors, leaks in the balloon, leaks in all other systems, positioning the floating solar energy facility for solar tracking, communicating with the ground station to coordinate landing, etc. The electronics could be located in a heated container next to the water tank which would likewise be thermally controlled.

Directional Control Mechanisms

FIG. 7 is a schematic diagram showing a landing sequence for docking the airborne floating solar energy facility. Attached to the floating solar energy facility are at least two sets of directional control mechanisms or "thrusters". One set is anchored to the side of the balloon, with one thruster on each side of the balloon, where only one of the two thrusters is shown in FIG. 1. The other set is anchored with one thruster on the front and one on the back of the balloon The side thrusters point in the x-direction and drive the balloon along that axis. The side thrusters are on a gimbaled frame which can rotate around the y-axis, to counter the overall balloon rotation as it tracks the sun. This arrangement can be used to control the balloon to always point the thruster in roughly the horizontal direction. The thruster is allowed to rotate around its contact point with the balloon, but is attached to the vertical tether coming from the side of the balloon, so it is always held largely horizontal. This allows for a gimbaled system without the active actuation.

The second set of thrusters are located on the front and back ends of the balloon, are pointed along the y-axis, and generates thrust along the y-axis. These could be likewise gimbaled if the balloon is intended to also rotate around the x-axis. The second set of thrusters is used in conjunction with the x-axis thrusters to generate thrust in any direction in the x-y plane. The balloon and solar energy collection elements must face the sun to collect energy, but the wind direction may approach from any direction. Therefore, the combination of four thrusters provides arbitrary counter thrust to resist the wind, but do so without generating a torque on the balloon, and hold the floating solar energy facility stationary regardless of the wind vector. This is effective during the generally geostationary energy collection phase. During landing, these thrusters may also be used to aid in the control of the descent and docking.

The thrusters may be anchored to the balloon using a plurality of tensioning cables running in loops making contact with the surface of the thrusters opposite the balloon. Each thruster is attached to a compression bar which is pressed against the surface of the balloon at one end, and attached to tensioning members at a point near the far end. These loops, once tensioned, will compress the bars against the inflated balloon skin. The thrusters are attached to the compression member between the balloon and the tensioning cable anchor point. By having the thrusters closer to the balloon than the tensioning cables, the loading on the bar is minimized. Loading between two anchoring points is an advantage over cantilever loading. Additionally, this places the tension cables as the furthest out elements, which can act as protective barriers of the last resort to reduce the chance of the balloon being damaged in the case of a collision.

The loops are attached to the balloon skin at points between the thrusters, approximately midway. In this area, the cables are sitting tangentially to the surface, so a simple surface clamping structure will anchor the cable to the floating solar energy facility. By using a nearly continuous loop running around the balloon, the tension in the cable does not need to be passed to the balloon skin; this avoids high stress spots on the skin. Several loops would be run around the balloon, to cross over each thruster so as to provide anchoring in both directional axes on the surface. An example layout of the tension wiring is shown in FIG. 1. For the thrusters on the sides (middle of the balloon as depicted in FIG. 1), the compression member also serves as a rotary axis around which the thruster can rotate. This allows the thruster to generally point horizontally, even when the balloon is rotated. This rotational attachment technique can also be used for the front and back thrusters if the balloon design is intended to carry out 2DOF rotation.

Applications

This platform is usable for a wide range of applications. This system may, by way of non-limiting example, be used for energy harvesting, as described in detail in the energy harvesting operation section. Other uses of the platform include long duration, large payload operations such as surveillance, monitoring, telecommunications. The low power required to hold position by the airborne floating solar energy facility platform is another advantage, due to its airship design it is able to statically stay aloft. An alternate use for the platform would utilize the energy capture capability to continually charge the batteries in order to provide a continuous supply of power to both the thrusters and the externally carried section. Such operation would enable the platform to go on indefinite duration trips while supplying large payloads with high power draws. The cyclic operation scenarios would have a base of operations for the school of platforms, where air control sensors such as radar may be used to establish the location of the school and provide sense-and-avoid capability for the school against other air traffic.

Energy Harvesting Operation

There are four phases of operation: liftoff, harvesting, landing, and energy transfer. Each phase of the operation is described below.

Liftoff

Figure 9:
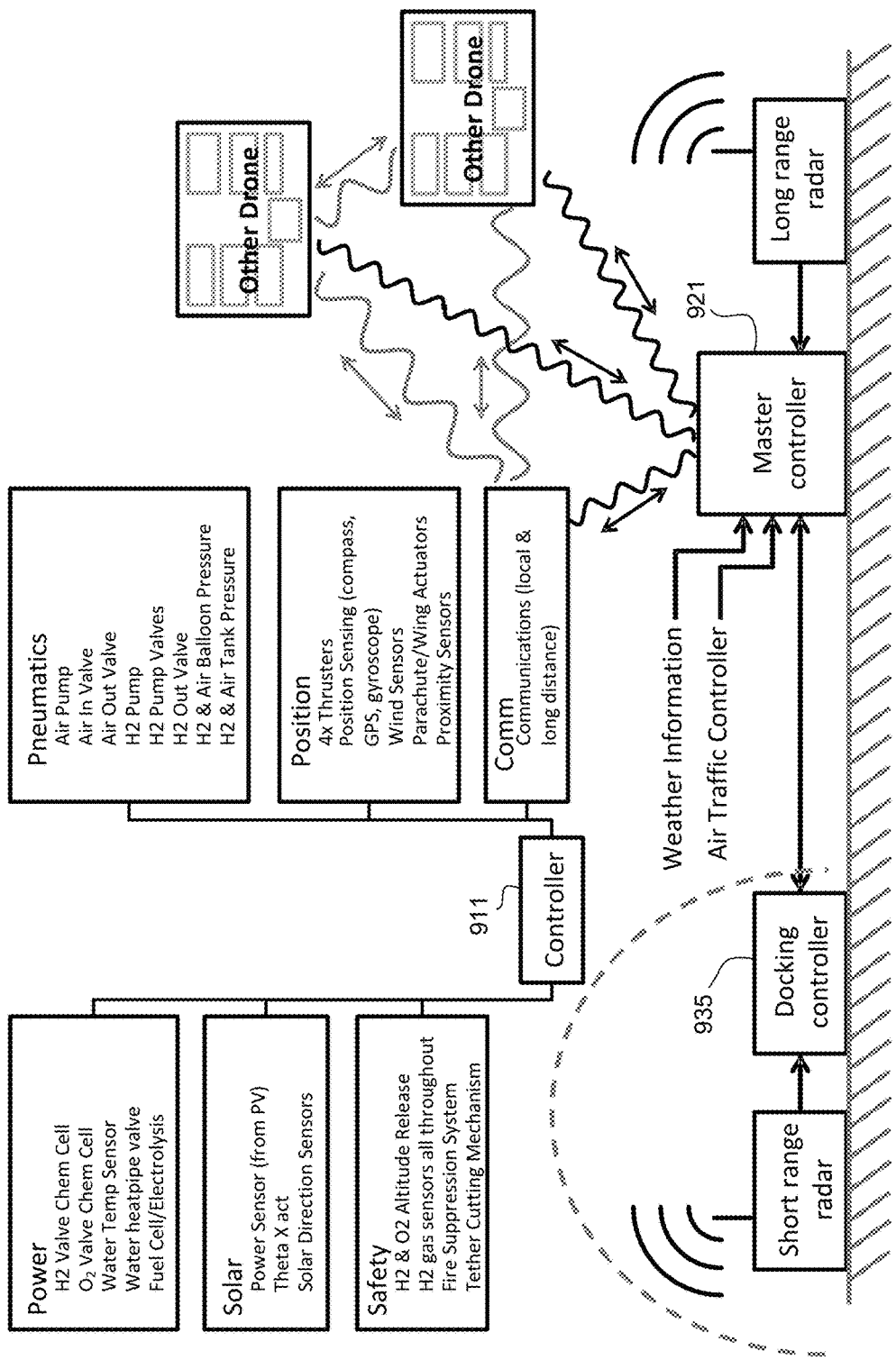
FIG. 9 is a schematic diagram showing the control of the airborne floating solar energy facility.

FIG. 9 is a schematic diagram showing the control of the airborne floating solar energy facility. Flight operations and control of transfer of energy is performed by an on-board controller 911, which is responsive to a master controller 921 at a ground location. Additional operations, such as docking control can be executed through the master controller or separately, as for example, through docking controller 935.

At the beginning of the cycle the solar energy facility is prepared for takeoff. The system is provided with a full supply of low-energy precursor chemical(s). For one non-limiting example mode, the system starts with the batteries effectively empty or fully discharged. A small amount stored energy may be retained for drone operation. The balloon is filled with enough lift gas to provide liftoff with the desired velocity; the remaining portion of the balloon is pressurized with air from the atmosphere.

The balloon is released from its mooring and rises vertically into the air. As the balloon rises, the lift gas will take up more space in the balloon. Air is vented from the air side of the balloon to maintain a constant slight overpressure while avoiding the excessively high pressures that could result in balloon burst.

When the balloon reaches the harvesting altitude, the lift control system zeroes out the lift force. Either enough hydrogen is removed to bring the balloon to neutral buoyancy, or the balloon pressure is increased to raise the mass of the balloon, or both are used. Air is pumped from the environment into the balloon to compensate for the removal of the hydrogen and maintain the balloon pressure at a target value.

Energy Capture

During harvesting the floating solar energy facility maintains a fairly constant altitude. This altitude is currently envisioned to be approximately 17-22 km, known as the tropopause. This is above airline traffic, the jet stream and above 90+% of the atmosphere. Altitude adjustments are made by varying the lift gas or air mass in the balloon. Lateral adjustments are made by the use of the thrusters, which are able to drive the solar energy facility at greater speeds at high altitude.

Throughout the day, the balloon is rotated to face the solar energy collection elements (photovoltaic cells in one or more photovoltaic collector arrays in one non-limiting example mode) at the sun. The balloon tilts about the y-axis through the keel being driven along the cabling system. The solar panels are placed at about 30° off of the horizontal top surface, and the balloon will capable of further tilting about 30° downward to point the solar energy collection elements a total of 60° off of vertical. This allows the balloon to catch all but the earliest of the sun's rays at near normal incidence. After noon, the balloon spins 180° around the z axis and tracks the sun down the other side. Thus near full tracking is achieved with only 30° of rotation, which is relatively easily achievable with only shifting the keel distribution. The balloon is rotated, and absolute location is maintained, if necessary, by the fans/thrusters on either side.

The energy from the solar energy collection elements is used to charge the electro-chemical cell, which stores the energy. In another non-limiting example mode, electricity from the PV solar panels is used to power an electrolysis unit. The electrolysis unit converts the water to hydrogen and oxygen. The oxygen is stored in its own container. The hydrogen is stored in the hydrogen portion of the tank. As the water is converted to gas the mass in maintained. Harvesting ends when the water is almost completely consumed.

Landing

Landing is started by removing lift gas from the balloon or increasing air mass until the floating solar energy facility starts to fall. The wing cables are released such that the wings can inflate. Direction is controlled by changing the angles of the wings through the wing cables. The descent speed is controlled through the rate of hydrogen being pumped from the balloon to the tank.

Figure 8:
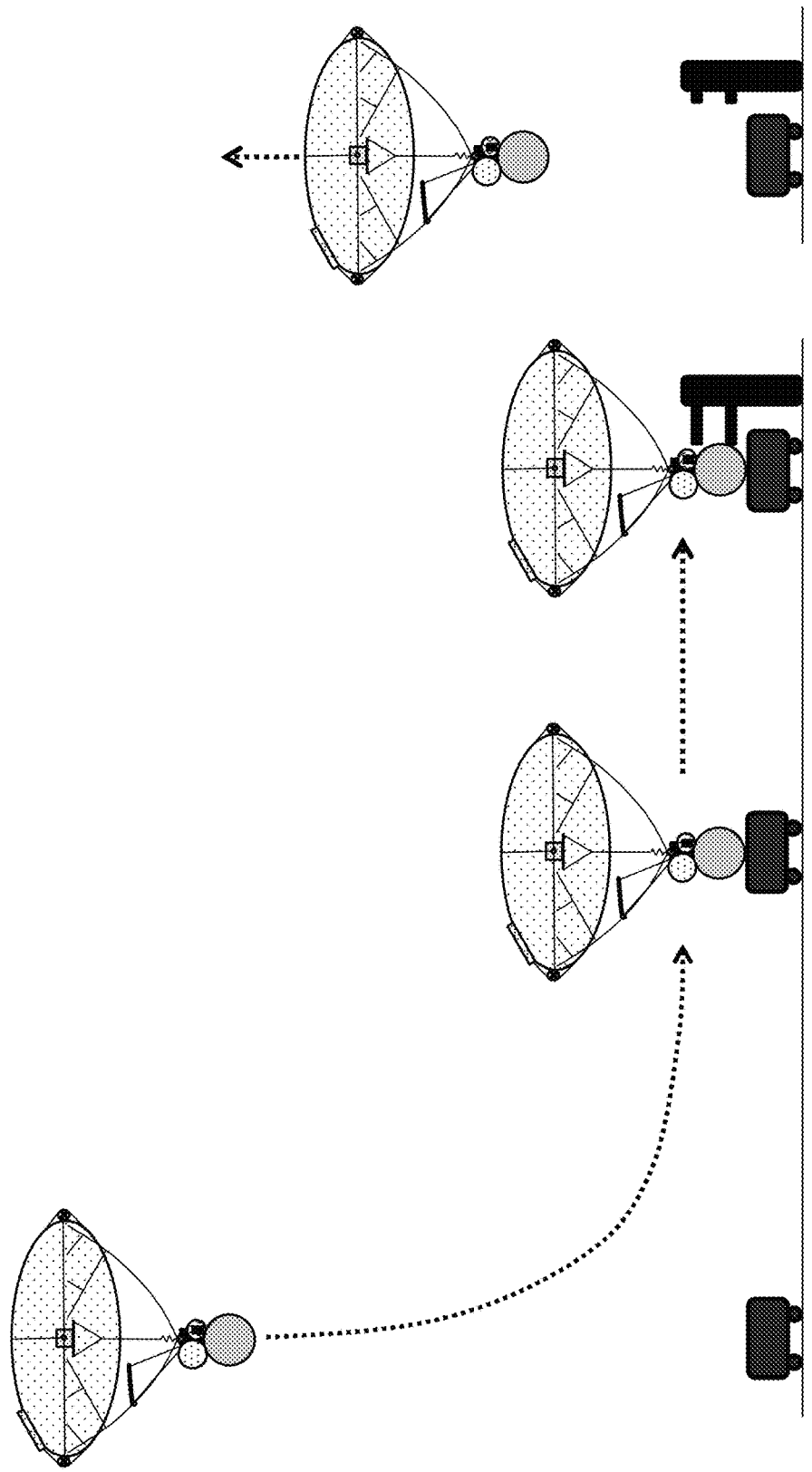
FIG. 8 is a schematic diagram showing the floating solar energy facility landing, automated capture, refueling and release.

FIG. 8 is a schematic diagram showing the floating solar energy facility landing, automated capture, refueling and release.

Upon reaching the ground station, the mobile solar energy facility is caught by a mobile ground platform and transported to the filling station. Initially, the solar energy facilities may guide themselves or workers may guide the floating solar energy facilities, pulling them to the correct station. The floating solar energy facilities are controlled to be neutrally buoyant or slightly heavier than air so they should be manageable by a worker or worker and automated unit. Eventually, this process will need to be automated to meet the power demands. This would involve a landing runway type setup, where the solar energy facilities fly in at a shallow angle, and a ground cart, possibly on a track, catches up to equalize speed with the solar energy facility. Contact is made, and the ground cart now drives the mobile solar energy facility to a cradle.

Fuel and Precursor Transfer

At the cradle, the floating solar energy facility is moored. The majority of the fuel—in the example mode, hydrogen and oxygen—is removed from the floating solar energy facility by either a mass transfer process for the attached tank or a tank switching process to remove the product-filled tanks and replace them with feedstock (water)-filled tanks. This process leaves enough lift gas for powering the ascent and enough stored energy to operate the drone as it returns to altitude. The floating solar energy facility is checked and any needed regular maintenance is performed. Just prior to takeoff, lift gas is added to the lift gas chamber or air mass is removed from the balloon to create the takeoff force.

In the case of energy storage with batteries, the batteries may be discharged or may be transferred and replaced with previously-discharged batteries.

Ground Station Layout

The ground station can be either located on land, at sea, or in the air if desired. The station is envisioned as a several segment structure. First, the airborne floating solar energy facility is captured by the capture structure, which in a non-limiting example is a ground capture vehicle. The solar energy facility (no longer airborne) is then shuttled to a docking structure, "cradle", where it is inspected, emptied and refilled. Finally, the solar energy facility is shuttled by the ground capture vehicle to the exit, where it is released for return flight.

It is noted that the capture systems aid in landing the drones, while the cradle systems deal with the energy transfer. The capture systems may be mobile vehicles, while the cradle systems are often stationary docks.

One instantiation for the station is to operate in a linear fashion. At one end, the floating solar energy facilities are captured, then they pass through a large structure where maintenance and mass transfer/inspection is carried out, then they are passed to the other end where they are released. Multiple main axial rails would run the length of this setup, with cross-connects so the floating solar energy facilities and ground capture vehicles could be routed around damage. In a non-limiting example, this would use at least two lines, and possibly three or more lines. The capture and release ends of the station would be made symmetric, so if the wind direction changes, then the orientation of the station can be changed without issue. They could be raised by about the height of the balloon about 15-30 m, so if the floating solar energy facility misses, it can fly over the station without crashing, and ii) the station entrance tubes are out of the wind. In one configuration, the station can be raised by use of a gantry or earthen berm.

Another instantiation of the station is to operate with a generally circular layout. The main station is under a flat roof that is at least high enough for the floating solar energy facility to pass under it with clearance. The flat roof is the capture and release area. The edges of the building are sloped so that floating solar energy facilities and ground capture vehicles can be driven up and down the slope, perhaps at around 45°. Once the floating solar energy facilities are captured, they are pulled in parallel with the wind until the ground capture vehicle drives off the edge of the roof and into a trench area around the building. The trench is formed by the sloped edge of the building on one side and by a wall on the other side. The wall around the main building is as high as the flat roof. The outer face of the wall (away from the building) may be a likewise sloped surface so that wind hitting the wall is directed up and over, as well as any floating solar energy facilities that collide with the wall. The wall is a distance away from the edge of the main building so that at least one floating solar energy facility can pass along the trench, or two. The outer wall may be hollow with only the sloped outer surface covered. Then multiple floating solar energy facilities can pass around one another when traveling in the gap area between the building and the outer wall. Once the floating solar energy facility and ground capture vehicle is pulled off the roof, it is brought into the main building, where a grid of floor and ceiling rails with mounting points can guide the floating solar energy facility to any of a grid of docking systems. Additional space may be used for maintenance and storage. Once the floating solar energy facility is emptied and refilled, it is shunted back out to the trench via ground capture vehicles, and it is then brought back into the wind and released once it has positive buoyancy so it will rise. One possible distribution layout is to have the floating solar energy facilities being captured along an axis parallel to the wind passing through the center of the station. The floating solar energy facilities then fly in from upwind, get captured and get pulled down in the downwind section. The floating solar energy facilities ready for release are brought to the other two quadrants of the station (left and right), and either released in the trench or brought to the roof. There may also be a hole in the roof at the center of the station, so it forms a donut. Then arriving floating solar energy facilities come in from upwind, are routed to the center hole and down, then when ready for release are routed back up the center hole or sides and released at the downwind end.

Another instantiation of the station is to have a widely separated set of capture systems that are combined with cradles, so the drone blimp chooses with station to land at, halts there for the duration of the exchange, then takes straight off from the landing spot. This has the advantage of simplicity, but requires a significant amount of spacing between the stations to allow for other drones landing. The landing and launch patterns would also be intermingled, which could cause accidents. However, in areas with significant space, this may be a simpler design. For instance, if the operation is carried out over the ocean, small platforms could be deployed as capture and cradle combined, and then widely separated. Systems (boats) could shuttle tanks/batteries between these platforms. This would provide a simple, scalable and robust station out over the water.

For a 1 GW station, the capture region might be 300 m×300 m, or about 0.1 km². The main building would have a grid of about 80 cradle systems, perhaps distributed as a 10×8 grid, with the 10 length being parallel to the main axis of the station. Each cradle system would be separated by more than the diameter of the balloon, so that a floating solar energy facility could be docked at each without collision. Main rails would be interspersed between the grid of cradles, with 8+1=9 main axial rails, each separated by perhaps 50 m, for a total dimension of 350 m long, and 450 m wide. The release region would be made the same size as the capture region. Maintenance and storage may be carried out on the floor above or below the main bay. This size is comparable to 2 km² for a 1 GW nuclear power plant or about 30 km² for al GW of ground-mounted solar array.

Capture and Cradle Systems

The grounded station will have two major systems among others. These two are the capture system and the cradle systems. The capture systems are specifically designed to capture the incoming floating solar energy facilities during their landing efforts. The capture systems are generally referred to as vehicles as in "ground capture vehicle", but a later instantiation notes that they can be operated as immobile systems. A second set of systems, the cradle systems, are separate from the capture system and perform a different role. The cradle systems carry out all of the energy (tank, chemical, etc.) transfer onto/off of the floating solar energy facility as well as inspection operations of the floating solar energy facility. The cradle system is generally a non-moving station to which the floating solar energy facility is brought. The cradle system specifically refers to the structure where the floating solar energy facility is brought to have the energy transferred out of it, and to be inspected for damage/issues.

While the capture and cradle systems are described separately, it is possible to construct the capture system to include the cradle systems.

Capture

The capture systems have two main features, i) a means to attach to a passing floating solar energy facility, and ii) a means to anchor to the surface below.

For the floating solar energy facility attachment, several devices might be used that would be capable of anchoring to the floating solar energy facility. This may include an arm, a net or extended loop of tether, a magnetic grapple and/or a small quadcopter with a tether. Another option is for the floating solar energy facility to have a possibly extendable rope hanging below it, which would have an attachment point at the end of it such as a loop or hook. The default technique may be for the floating solar energy facility to drag a loop below it along the ground until the loop is caught on the ground capture vehicle. If this misses, the ground capture vehicle could accelerate to catch back up with the floating solar energy facility and force an attachment. Once the attachment is made, the floating solar energy facility is reeled in and keel mass is clamped down to the ground capture vehicle. The floating solar energy facility can be made heavier than air by the lift control system (removal of lift gas or addition of air mass) in order to land quickly.

For the ground attachment, the ground capture vehicle would be able to drive along the ground and clamp down to anchored rails or use air bearings or some other technique to anchor to the surface. In one non-limiting example the rail design is used, and in the capture area, the rails may be upside down T-shaped cross sectional metal extrusions embedded in concrete. The anchor structure on the ground capture vehicle is a T-shaped bar that cannot be removed from the rail due to the arms of the T. The intersection of these extrusions is a gap that allows the ground capture vehicle to choose which direction to go. The T may have rollers on the surface to avoid sliding. When under high wind load, the T-bar would keep the ground capture vehicle from being pulled off; otherwise it would ride along within the rail without significant friction. This would keep the ground capture vehicles down and allow them to change direction at intersections, but make them resistant to being blown away by high wind loads.

It is desired to have the floating solar energy facilities traveling with the wind so as to ensure they have a velocity relative to the ground. This is the opposite to the conventional technique of approaching directly into the wind. Conventionally, a landing airplane is high mass, has significant kinetic energy and has a velocity that is well above the wind speed, so approaching into the wind slows the approach velocity relative to ground. For the floating solar energy facility, the situation is reversed. The floating solar energy facility has little mass, little kinetic energy and can not necessarily generate a velocity exceeding that of the peak possible winds. It is thus simpler to approach by floating in with the wind, perhaps using the thrusters to add to that velocity and control the position to ensure capture, and then use the thrusters at the last moment to reverse thrust while over the capture pad and attempt to hold position. The scale of the thrusters relative to the floating solar energy facility mass are such that the deceleration would only be a few seconds, unlike a conventional fixed wing aircraft. The floating solar energy facility would seek to align its landing with the rails, so as to simplify the capture operation. To this end, the capture and release sections may have a cross-hatched pattern of rails so the ground capture vehicles can travel in two perpendicular directions. The floating solar energy facilities can then drive with propellers to come in as close to parallel to these rails as possible, while the ground capture vehicles synchronize speed to improve the chances of capture. To maximize the chances of catching the floating solar energy facility, several steps would be taken:

- Rails are arranged in multiple directions, possibly 0°, 90°, or at 45° angle
- Floating solar energy facilities align last part of flight to the rails
- Multiple ground capture vehicles may be tagged in to capture the floating solar energy facilities if problems arise
- The capture/release areas may be made large to give the floating solar energy facilities sufficient time for engagement, perhaps squares about 100-150 m to a side
- As the floating solar energy facilities finally approach, they can drive their thrusters in reverse to slow just when they approach the ground capture vehicles.

The capture and release side would be switched as needed to ensure that the wind dot product with the flow of the station (from capture to release) is always positive which means it is always helping drive the floating solar energy facilities down the flow path.

Emergency ground capture vehicles may be deployed at the downwind end of the capture area with extra capabilities (tethered arrows, nets etc.) to grab missed floating solar energy facilities The ground capture vehicle is used to decelerate the floating solar energy facility and then guide it to the cradles. The ground capture vehicles are lined up in the upwind section of the capture region, and can grab floating solar energy facilities as they arrive. If the wind speed exceeds the operating speed of the floating solar energy facility, the floating solar energy facilities will be able to come in with the wind to ensure they can reach the station. This allows the floating solar energy facility to approach with the wind if it is unable to exceed the wind velocity. Once the floating solar energy facility is captured, the ground capture vehicle will proceed down the main rails towards the main building. These rails can be designed to drop in height to bring the floating solar energy facilities under cover from above and the side, so as to get them out of the wind.

Another design would use parallel tracks in the landing/launching area, similar to the previous description. The ground capture vehicles could be configured to have a wide base to handle the very large balloon side. It could have a Y shape balloon catcher pointed vertically. The extreme end of the two arms would be configured to anchor to the front-back x-direction pointing side thrusters or compression bar. It is preferred that the anchoring be to the compression bar or the tension wires, rather than to the balloon directly. This ensures the load passes through the designed hardpoints and is distributed by the preloaded wiring. As backup, loops hanging off the balloon could be slid onto hooks so the balloon is held even if the main Y-arms fail.

The attachment at the end of the Y-arms could be configured so that the wind pressure pushing the balloon horizontally would anchor it further into the attachment point. The Y catcher could be rotated around its central vertical axis to be aligned with the wind direction. This would allow it to capture the incoming blimp regardless of which way the wind is flowing. It would also allow the drone to be pointed into the wind even after it is captured, which ensures the wind pressure is kept to a minimum. When the blimp is to be released, the drone could be spun around so the wind pulls it out of the attachment, or it could be leaned backwards so the buoyant force pulls the blimp out. The cart could then be driven along the rails into the station while the drone blimp is pointed into the wind, whichever way that is.

Small drones on both the blimp and on the ground capture cart could be used redundantly to pass mooring lines, which could then be reeled in if the drone is going to miss the catch. The small drone on the blimp is the same one that is described in the safety section for inter-drone redundancy, and both require the drone to carry a small tether. The Y catcher would act like a target for the drone. If the blimp is not in line with the target, the rapid drones with mooring lines (traveling ahead of the main blimp or held out in front of the target from the ground) could be used to make a quick clip in, which could then be rapidly reeled in to ensure the blimp passes into the Y-catcher. The small drone on the blimp would be preferred, as it would float in with the wind and the blimp. A simple technique would be to have a clip at the end of the line that the blimp small drone can use to clip into a spool. As soon as this clip is attached, then the small drone releases the line and the spool pulls the keel in to an anchor point at the joint of the Y-catcher. A similar technique provides a configuration with the connection drone being at the end of a tether with a clip, floating above the Y-catcher. The drone would chase down the incoming drone, clip to the keel and then be reeled in with the blimp into the catcher. Using both would increase the reliability.

Another mechanism that could be used to aid in capture would be an adjustable wind wall. The wind wall could be rolled around to be down-wind at all times. This would create a turbulent zone ahead of the wind wall, where the wind velocity would be reduced. It would be easier for the drone blimps to then glide into the dead zone, and be carried out. The wall could be attached to a rail and be rapidly updated to be downwind. Such wind walls could be placed equally on both the landing and launching sides. These would act to control wind flow over the areas as needed. This wall could have a net on it that could halt drone blimps which would otherwise have missed the landing operation. Also, the landing small drone could be used to clip to the wall, providing a sixth means to effect capture. Finally the emergency ground-station drones noted in the safety discussion could be used to chase down the floating solar energy facilities which have escaped the other safety mechanisms, and possibly attach a tether to the floating solar energy facilities for a forced return to the station.

Y-catcher
Drone-based tethered drone makes contact
Ground-based tethered drone makes contact
Secondary Y-catchers
Blimp catches in net
Blimp drone-based tethered drone clips into net
Emergency drones based in the ground station catch and tether to make contact
Transfer to Cradle Systems Once under such cover, the ground capture vehicles could either transport the floating solar energy facility directly to the cradle system or pass it off to a more efficient rail transfer guide, which has anchor points both above and below the floating solar energy facility (as well as rails both above and below). This ensures that the floating solar energy facility does not drag behind while being driven around. The two-point contact rail guide takes the floating solar energy facility into the building and to a docking port. While the cradle stations may be laid out in any way, a simple form would be to have a line of cradle stations on either side of each of the main axial rails. Each cradle would be accessible from opposite sides by two main axial rails, and there would be redundant rails of each of the main axial lines to route around damage. By making it possible to pass over the cradle station areas, the floating solar energy facilities may be "hopped" or moved between main axial lines to route around damage.

The cradle systems would likely reach to the keel of the airborne floating solar energy facility from the side and would extend out to make the contact, thus allowing for the floating solar energy facility to pass through the cradle station berth without contact if needed. The floating solar energy facilities would likely be maintained with their long axes pointed along the main rail axis to minimize rotation time, as this would be a slow process. The ground capture vehicles would be separated by slightly more than the length of the floating solar energy facility.

Shuttle Vehicle

While the configuration described above relates to a fully functional floating solar energy facility being launched from and retrieved by a ground station, it is alternatively possible to provide transportation of the fuel precursor and the produced high energy fuel with a separate shuttle vehicle. The use of such a shuttle vehicle has the advantages of being optimized for transport, and does not necessarily require photovoltaic collector arrays or electrolysis equipment for generating the high energy fuel from the precursor. The shuttle vehicle ferries the materials to and from the airborne floating solar energy facilities. In addition, it is possible to transport individual components to and from the airborne floating solar energy facilities, allowing for replacement and more efficient climb and descent profiles of the airborne floating solar energy facilities.

The precursor and high energy fuel can be transferred using tubing or other conduit, or may be transferred as a complete tank unit or as a complete tank along with an energy conversion (electrolysis) unit, as an energy conversion and storage system.

Repair and Storage

Floating solar energy facilities showing damage can be routed to a separate area of the plant for maintenance, possibly up or down a level. This would require an elevator-like feature. The repair level would provide both an area to do deeper maintenance/replacement as well as a region to store the floating solar energy facilities during high wind periods. It may also be done in the main building, just to the sides of the main ground cradle stations area.

Fuel and Precursor Transfer Operation and Storage

The gas can be routed outside the main hangar building to a central purification and storage facility, which delivers hydrogen to either be used to generate power, or shipped off as a product.

The gas could be handled by moving around the tanks that are removed from the drone, so the fuel does not need to be drained and re-pressurised. This simplifies the system operation, energy demands and maintenance by not requiring pumps In one non-limiting example mode, the gases captured from the floating solar energy facility will generally need to be stored in order to smooth out the input flow of gas. The platform produces a large quantity, and then deposits it as a sudden spike to the ground station. The station gas management equipment is most efficient if running consistently at full utilization rather than spiking in demand. To level this, the gases are captured and stored, then passed through the gas management system at a consistent rate and stored for use—either selling, chemical operation or power generation. As a rough approximation, the lowest cost for ground capital is to have the gases produced in each platform cycle take the full cycle to process, which places an approximate time scale for the storage of the gas. This can be lengthened to provide buffer to the supply chain.

The most energy efficient mode for gas storage is to store the gas nearly at the pressure in which the floating solar energy facility outputs them. The hydrogen gas is output at approximately 50-65% of the maximum tank pressure, as the tank is retains some fuel for drone operation by the floating solar energy facility. The pressure will start at the maximum tank pressure (about 2 MPa in one non-limiting example mode) and drop to about 50-65% of this (1-1.3 MPa) before the floating solar energy facility is ready for heading back out. The station hydrogen pressure can then be held at about 1-1.3 MPa without requiring any substantial pumping equipment or energy demand. This significantly simplifies the gas operation, as the floating solar energy facility source is providing the pressure. This low pressure is advantageous because, below 20 bar, hydrogen can be safely carried in existing steel and plastic pipes. At higher pressures, such as 40 bar and higher, there is risk of hydrogen being absorbed into the material of the pipe, which could cause hydrogen embrittlement in the case of some metals and would be difficult to contain in plastic.

The oxygen gas is output at the maximum tank pressure (2 MPa in the example mode) and will drop to atmospheric pressure upon fully emptying (0.1 MPa). The oxygen pressure in the station can then be held at approximately atmospheric pressure.

Given that hydrogen is buoyant, storing it at pressure reduces issues of buoyancy on the station equipment, but this is not a problem for oxygen. Thus, while hydrogen is generally held in a compressed or liquefied mode, the oxygen generated in this system is not nearly as restrictive. It may be stored in flexible containers. It is more dense, less likely to leak, is of less value (can be replaced cheaply) and not a direct explosion hazard. It is envisioned that the oxygen may be stored in flexible chambers like the balloon for the floating solar energy facility; this would tap into the manufacturing scale for the floating solar energy facility systems, and reduce cost.

The hydrogen storage is best carried out in controlled rigid tanks. A low cost solution for storage in the station would be to utilize tanks similar to the ones being mass produced for the floating solar energy facilities—carbon fiber wrapped tanks with a metal liner. This would benefit from the manufacturing expertise and economies of scale already exploited for other systems. These tanks are the scale of 1-3 m diameter and about 50 kg, so easily movable with conventional equipment. An overhead gantry crane may also be used for automated tank removal/replacement to speed the process. Additionally, many smaller tanks provide the opportunity for a more robust storage system, which is a similar approach to the overall use of floating solar energy facility schools.

One possible station design would be to have the tanks removably attached to a main horizontal line, with the tanks sitting in pits dug in the ground (or in concrete), so the tank is fully below ground level. The tanks could also be placed in concrete cells above ground. The top of the pit would be covered by an air-permeable grating, but that would keep objects from falling onto the tank. The pits provide a low cost safety mechanism to contain gas losses or explosions and to keep the tanks decoupled. The top grating may be removed and the tanks lifted out of the pit for maintenance or inspection. Hydrogen sensors in each pit can be used to indicate when a tank requires special inspection. By making the tanks removable from the main line, maintenance may be carried out without interrupting the full scale operation. A new tank would be switched in, and the old tank moved to an inspection facility. The pit provides further safety as it could easily be flooded with a protection agent such as heavy inert gas, carbon dioxide, water, or fire-retardant foam in the case of fire or emergency. This would seal off the tanks from one another and from oxygen, halting any spread of damage.

Failure Issues

In the case of a floating solar energy facility crash into the rails, the ground capture vehicles could push the wreckage down the rail away from the working area. Other sections of the rail could also be used by rerouting the floating solar energy facilities around the bays, perhaps through various ground capture vehicle regions.

Mobile Stations

The station setup may be put onto a ship for polar operation, and reduced in scale by several steps. A main line would be set up down the center of the airborne floating solar energy facility, with ground capture vehicles on either side. The ships are generally about 70 m wide, and 300-400 m long, meaning they can have about 20× ground capture vehicles per main line. It may be possible to stack several lines and ground capture vehicle systems, perhaps up to 3×, providing the ship with approximately 1 GW worth of capability. Stations may also be deployed in floating boats around the main tanker to expand the capability.

Emergency Power Demand

The floating solar energy facilities each carry a substantial amount of hydrogen used for buoyancy, about 5-10× a single cycle. In the case of an emergency power demand, this lift gas can be extracted from the floating solar energy facilities to provide a burst of fuel. Normal cyclic operation would only transfer out the hydrogen generated at altitude from water electrolysis; it would not extract the lift gas for power. However if the energy is needed it can be made available. The exchange is that the floating solar energy facilities can no longer take off afterwards. They must instead be grounded until enough hydrogen is generated to provide full lift control.

Grounded floating solar energy facility platforms can also be used as grid storage, as they can be plugged into DC from the grid (through an inverter) and their electrolysis systems used to convert excess grid power to stored hydrogen, which can be processed with the existing infrastructure. This may be done during the night with floating solar energy facilities that are to be released at daylight. Alternatively, the storage can be done with electrolysis units that are removed from the floating solar energy facility.

Safety Mechanisms

There are several main scenarios that need to be accounted for regarding the safety of the solar energy facility: 1) the floating solar energy facility loses lift, 2) the floating solar energy facility is hit by another air vehicle, and 3) the floating solar energy facility misses on landing.

There are many safety mechanisms employed on the platform in order to prevent danger to mitigate the risk from each of the scenarios laid out above. The ultimate goal here is to ensure that there is never an uncontrolled landing of energetic chemicals.

The safety mechanisms can broadly be separated into four main levels as noted below: i) intra-platform, ii) inter-platform, iii) shepherd ships, and iv) ground based.

Shepherd System

A Shepherd ship is also a lighter-than-air Unmanned Aerial Systems (UAS), with the role of acting as a secondary safety net should the primary capture mechanisms fail. These Shepherd ships may be standard floating solar energy facilities operating below the school, or may be specialized systems with extra communications and imaging equipment to enable ground based controllers to communicate with the floating solar energy facilities even in poor conditions. The presently non-limiting example mode is to use the standard floating solar energy facility, as it is mass-produced, and is able to run through the standard cycle including cyclic ground inspection without any requirements over standard floating solar energy facilities. The Shepherd ship would be located below the school. When a floating solar energy facility begins to fail or show issues related to operational problems, the Shepherd ship would immediately proceed to place itself nearly below the damaged system. It could use the standard onboard drone to attach to the damaged floating solar energy facility if needed, and would vent unused precursor chemical (water) if extra buoyancy is needed to hold the damaged system. As soon as the Shepherd ship is occupied with the damaged system, another floating solar energy facility from the flock would be designated to fill the guard spot formerly held by the occupied Shepherd ship, and shifted into the station below the flock. This guarantees there is always a secondary safety net.

Shepherd ships are deployed with a "school" (group) of solar energy facilities to provide sensing and backup for emergencies. For example, when a solar energy facility finds itself in an uncontrolled loss of altitude, the Shepherd ship can image and potentially guide the floating solar energy facility down.

The Shepherd ships may also have deployable fast UASs that can get to damaged floating solar energy facilities for imaging, or control purposes. These deployable UASs may also be provided to a subset of the standard floating solar energy facilities. The deployable UASs may be fast moving vehicles such as fixed wing craft, which can rapidly maneuver over to the damaged vehicle to get an image, and possible establish a connection to the damaged system. Such a connection may be used, for example, to physically connect the damaged system to a healthy floating solar energy facility via a tether carried by the UAS, or the UAS may attach and deploy a small parachute that slows the descent of the floating solar energy facility. The combination of floating solar energy facility plus parachute may then be used to guide the floating solar energy facility to a controlled landing.

Shepherd ships may also have sensing to detect incoming objects such as planes. They can radio to the plane to warn of the school as well as send signals to the school or errant solar energy facility to either gain or drop altitude to avoid a collision or to cut the tank loose, as a last resort, should it look like a collision is inevitable.

Priority of Safety Mechanisms

The four main levels of the safety mechanisms, i) intra-platform, ii) inter-platform, iii) Shepherd ships, and iv) ground based, are ordered by priority of use. The priority of use is dependent on a measure of nearness to the issue and thus rapidity of response. The first level includes safety mechanisms on each floating solar energy facility platform for use on itself. These all have the critical flaw that they can fail and can be taken out en masse by certain events such as an onboard explosion. The second level of safety, inter-platform, is engaged when the first level fails. This level utilizes the nearby floating solar energy facility platforms as sources of information and control over the damaged floating solar energy facility. The use of multiple independent systems provides significant redundancy, however these systems may not be able to reach the damaged system in time. The third level employs Shepherd ships, which are described infra. Shepherd ships may be utilized when the inter-platform level is insufficient, such as in cases of rapid failures. The Shepherd ships are located just below the main grouping within the school of floating solar energy facilities, to act as backup. The fourth level of ground-based interception is utilized when the third level is insufficient, and relies on UAVs sourced from the ground to act as the final layer(s) of redundancy to observe, track and control the descent of the damaged system.

Intra-Platform
Self-healing balloon
Fire retardant process
Hydrogen vents on balloon
Multiple layers to lift gas balloon
Air exchange via air compressors
Passive buoyancy of the floating solar energy facility
Backup hydrogen for excess lift
Altitude triggering dead-man switches to vent oxygen and hydrogen
Acceleration triggering dead-man switches to trigger balloon/tank separation
Paragliding wings for controlled descent
Separable balloon/tank with parachute on the balloon
Lights to warn off vehicles
Radar reflective balloon skin
Operation above plane airspace
Operation over generally uninhabited areas
Operation through air corridors
Cyclic equipment monitoring
Inter-Platform
School based observation and control Shepherd Ships
Shepherd ship observation and control
Ground-Based
Active local radar to warn system when planes are approaching
Ground-based interception
Fire and Leak Resistance The fire and leak scenario includes cases in which the balloon is leaking gas and and/or the gas has lit on fire. This must either be halted or the prevented from accelerating, preferably both. The "burning balloon" scenario has been studied for small drones, and is known to cause a flame when the balloon fabric is inelastic, rather than an explosion. The Mylar film is not elastic, nor does it catastrophically fail, so the hydrogen only meets oxygen at a small point. There is little overpressure, so the gas jet is not large. The polymer in the Mylar is not significantly flammable, so the fire spreads, but not with extreme speed.

First, the flames can be slowed by including fire retardant agents in the balloon fabric. Second, at altitude there is little oxygen to supply the flames, so by overdriving the air pressure side it may be possible to blow out the flame, reducing the fraction of oxidizer below ignition levels. A possible pressure overdrive would involve venting hydrogen rapidly as well as pressurizing the air side; this may raise the internal pressure sufficiently to blow out the flame. Third, a small supply of fire retardant and/or hole patching material may be stored inside the hydrogen balloon side, and be directed by a small turret and camera type setup. This might be searching for light and heat, and will then spray an expanding foam hole sealing agent at the bright spot to act as both a patch and to break the supply of fuel to the flame (if any). The hole patching material may be anything from a quick-dry expanding foam to confetti-like material with tacky surface coatings. Fourth, flaps of excess material can be left hanging in the interior of the balloon, to be drawn via air currents to the source of a leak, and act as temporary plugs. Fifth, surface monitoring drones may be used to explore for leaks and attempt to plug them, by sensing leaks with air flow and hydrogen sensors. These may be located both on the inside and outside surface. One example of this would be robots with three or more suction-cup feet, where air is blown in through a circumferential ring and vacuum is drawn through a hole in the center of the foot. By blowing air through the ring while drawing vacuum, the robot may skate along the surface without direct contact. The use of a fourth foot would allow the drone to step over obstacles without losing three-point contact. Small turbofans would allow the robot to propel along the surface, while looking at the balloon skin. When a leak or tear area is found, the robot may install a patch over the hole by turning off the air flow and only drawing vacuum. This would anchor it down to the surface, so it may perform delicate repairs and/or patching work.

An envisioned possible setup for the low-altitude, smaller floating solar energy facilities, would be to have the hydrogen chamber fully enclosed by the air chamber, with both chambers having excess material flaps for passive plugging, and the hydrogen chamber having an actively controllable fire retardant/hole patching small turret. For the high-altitude version, flaps of material may be hung down in both chambers to act as passive blocks for leaks, and a fire retardant/hole-patch turret may be placed within the hydrogen chamber, with a leak patching robot on the outer surface, powered from either the hydrogen or the PV solar panels.

Loss of Lift

There could be many reasons the floating solar energy facility may uncontrollably lose lift and the computer cannot regain control. In this scenario the system first has actively noted that it is losing altitude. The generation of hydrogen provides an additional source to temporarily maintain lift if the leak is small. The system will evaluate if the leak rate will allow for the floating solar energy facility to continue on the normal cycle and simply note this for maintenance upon return. If the leak is too rapid, or if the leak rate of change (when extrapolated) would lead to rapid gas loss, then the emergency controlled landing process is engaged. The helpful feature of passive buoyancy is that failures are not instantaneously critical. This provides time to employ the multiple levels of safety systems.

The system will first vent the water or other non-essential mass from the tank in order to reduce load, then vent oxygen. In the case of the burning floating solar energy facility situation, the oxygen would be vented away from the floating solar energy facility. The hydrogen is vented just before contact with the ground (say 1-2 km up), as it is valuable for retaining buoyancy and reducing the fall rate until the end. Dead-man switches would provide a failsafe to ensure the venting occurs before landing, even if power is lost. The air pump will continue to try to inflate the balloon, largely maintaining the shape and slowing the terminal velocity of the fall.

A second floating solar energy facility would be tasked to monitor the one coming down for emergency landing, and travel with it. The second floating solar energy facility can, by way of non-limiting examples, be either another floating solar energy facility platform or a Shepherd ship. This tasking occurs the moment the floating solar energy facility switches to emergency controlled landing state or goes offline. Controllers are used to drive the platform to a controlled landing in an unpopulated area, which may be back at the station. If the damaged floating solar energy facility is able to carry out a controlled landing, then the Shepherd ship is used to observe the process and the landing spot, and then return to the school.

If the damaged floating solar energy facility's condition worsens and the system notes that it is not able to come down in a controlled descent (defined as having the ability to control the landing speed to below a threshold and control the landing location), or if the second floating solar energy facility starts to lose the ability to maintain close proximity to the damaged platform, then the damaged platform is shifted into uncontrolled descent mode. The uncontrolled descent mode may be immediately initiated. By way of non-limiting example, three layers of safety are provided, which are: i) inter-platform, ii) Shepherd ship, and iii) ground based. All three of these sources can deploy fast UAVs such as quadcopters or fixed wing craft which can quickly reach the damaged platform. The present non-limiting example mode is a fixed wing craft, which could be operated vertically to hold position like a helicopter. The fixed wing craft offer more rapid flight to and from the damaged floating solar energy facility. These fast UAVs can image the damaged system, and provide information for the controllers on how to solve it. They can also interact with the platform to try and control its descent by a number of means including: i) attaching a tether to it that connects to another platform, ii) attaching a small parachute that can slow descent, iii) attaching the UAV to the damaged platform to begin steering it. The attachment can be made via clips to hard mounting points or a deployed net, or any other convenient technique. When its use is complete, the fast UAV would fly back to its floating solar energy facility platform, close to its launch spot, and can be reeled in via the tether connecting it to the main platform. It is envisioned that the entire fast UAV may be used as an anchor to get tangled in the other floating solar energy facilities' lines, and may have barb like attachments on its wings to ensure lines are captured. Alternatively, it may have an arm that could be flipped out with the tether and hook at the end. The imaging system on the fast UAV would be able to see the extended arm, and the fast UAV would fly by the damaged system, close enough for the arm to drag along the surface and clip the hook on a line or hardpoint anchoring spot as would be located all on the main platform.

Only a fraction of the platforms will likely carry these fast-UAVs as they will reduce energy capture efficiency. These would be the smallest systems and would likely use a tether. If the inter-platform control fails, the Shepherd systems can deploy fast UAVs. If all of these fail, the ground station can deploy fast UAVs to ascend up to meet the uncontrolled damaged platform. It is expected that the damaged platform would be limited in its terminal velocity by the large size and relatively low mass, meaning there may be anywhere up to a half hour to engage the uncontrolled descent.

Ground-based systems may, by way of non-limiting example, deploy nets or hooks to capture falling components and bring them back to the station. These fast-UAVs are sent off from ground when any issue arises, and have both imaging systems as well as the ability to clip to a floating solar energy facility platform, and possibly attach a releasable drogue chute to the platform. An envisioned setup for this is a fixed wing drone which can hover by orienting itself vertically. The fast-UAV would have an imaging system and a fold-out arm below it which would have a hook attached to a drogue parachute. The fast UAV may i) attach the hook and maintain contact with the damaged drone and try to use its wings/thrusters to control the object, ii) leave behind the attached drogue parachute, and deploy the parachute by flying away from it, as a line would connect the parachute to the fast-UAV. The line connecting the deployed parachute to the fast-UAV may be used to steer the now slower object, or the fast-UAV may also release that to let the object return on its own. The ground-based systems can be massively redundant, so dozens of fast UAVs may be deployed to make attempts at capture during the full length of the descent. Multiple quadcopters could deploy a net to capture tumbling parts, for example.

If no other platform is able to gain control of the damaged floating solar energy facility while in uncontrolled descent, a "release" command may be given. In response to the "release command", the balloon can be cut from the tank, and the parachute unfurled, leaving the tank with functional paragliding wings to make a controlled (by a pilot) landing. This offers the possibility to reduce the rate of descent and clear away damaged components if the balloon is fouling the parachute. This may be set to occur automatically by a dead-man switch (independently powered) if the descent velocity is above a threshold (say the balloon is torn to pieces and is obstructing the parachute deployment). Normally, the "release" command would be overridden by the active controller, and if the floating solar energy facility is under controlled descent it would not be at a velocity sufficient to trigger the "release" command. Likewise, the venting of the stored chemicals (water, oxygen and hydrogen in the example mode) will all be set to occur by altitude-based dead-man switches that must be overridden upon descent. Thus, regardless of whether the damaged floating solar energy facility reaches an uncontrolled descent stage by power loss, or catastrophic damage, it is assured to be an empty tank slowly parachuting to the ground by the time it reaches ground. In all situations the wings and balloon will limit descent speed and have some maneuverability to control landing rate and location.

The above renders four possible outcomes:
1) a controlled descent with no fuel,
2) a controlled descent with full fuel,
3) an uncontrolled descent with no fuel, and
4) an uncontrolled descent with full fuel.

The major focus in this scenario is driving the outcome towards the lower numbers, ensuring a controlled descent, as this makes it possible to find a safe landing space and thus remove the risk to the population below. The only route to a fuel-filled uncontrolled descent is through i) a failure of power before the emergency process kicked in, ii) a failure of all dead-man intra-platform safety measures, iii) a failure of the UAVs assigned to floating solar energy facilities to control the floating solar energy facilities, iv) a failure of the Shepherd ship to control the platform, and v) a failure of the ground-based interception.

The main problem is a combination of a major leak and power loss. This would cause rapid descent with no control, possibly before Shepherd ships could reach the damaged floating solar energy facility. A possible method for such a sudden change is an explosion onboard, which has the benefit of likely emptying the system of the fuel and hopefully dispersing the tank into numerous small parts which have low terminal velocity. If the explosion does not immediately result in the system falling out of the sky, for example, as the result of only a minor leak plus power loss, then the Shepherd ship can control the landing (outcome 1) or the system will passively slowly sink to the ground via balloon and/or parachute (outcome 3), and can be controlled via the inter-platform, Shepherd ship or ground-based safety mechanisms.

To mitigate the risk of outcomes 3 and 4, the large schools of floating solar energy facilities would generally be over low to zero population areas, for instance over the ocean. The controlled landing would likely be back at the power station, given that the school would generally set up in a grid directly above the power station.

Air Vehicle Conflicts

There are several safety measures deployed on the solar energy facility to attempt to avoid collisions with airplanes. The first is that the solar energy facility should always be at an altitude above commercial flights during harvesting and should only be ascending/descending in the prescribed airspace, under active control. This is ensured by the use of the guide balloon during any power loss, so at least one active, controlled system is available. An active floating solar energy facility will broadcast its position, which can be detected by TCAS (secondary surveillance radar, if a transponder is used for the broadcast), so air traffic can be rerouted should it leave its assigned airspace. It will also be able to control that position to miss incoming planes if the imminent collision is noted with sufficient time. The threshold for sufficient time would likely be 10's of km separation. A monitored section of airspace around the floating solar energy facilities would provide the buffer of scale 10 km to give the systems sufficient time to react. The emergency measures would be engaged should the floating solar energy facility or pair stray outside its assigned airspace, or into prescribed air corridors, and air traffic notices an incoming plane on a collision course. The second measure is that the solar energy facility has an inherently large radar signature from the aluminized skin of the balloon and tank so that it will easily appear as a primary ATC radar target, as well as having lights. This should help warn planes of the solar energy facility by radar. Third, the base of operations from which the floating solar energy facility cyclically travels may have a TCAS radar tracking device, or other sensor station so as to determine the location of both the UAV platforms as well as other aircraft. This could be used to avoid possible collisions by heading off the aircraft or changing the platforms' trajectories. Since the platforms are generally just traveling up a vertical air column to the operating altitude, then deploying and holding position, this may all easily be covered by the base station radar. Finally, in the case of an impending collision, sensed by a local sensor network on the floating solar energy facilities for high speed incoming objects, the balloon and tank can be detached, separating so as to let the air vehicle fly through unobstructed.

Missed Approach

Should there be problems on landing, the platform has the option of using thrusters to attempt to circle around or to regain lift and come around for another landing in a few minutes. Once the solar energy facility has gained enough altitude it can attempt to descend again, using the wings and thrusters to guide it back on course.

Should be solar energy facility be unable to regain altitude or in any other way be uncontrolled, say under high winds, the ground station will have emergency catchers (either human or UAV), which are the fourth tier of safety-ground-based interception UAVs. These would attempt to hook the solar energy facility to help bring it in. In addition, the ground station is equipped with nets and a safety zone around the edges to minimize issues with potential crashes. The UAV catcher would be a high speed drone with a cable and attachment structure (say hook), waiting just after the end of the landing zone. If the floating solar energy facility misses, the drone is launched and snags the floating solar energy facility. Multiple catchers may be placed at the end of the field, automatically waiting for a floating solar energy facility to come into their zone and then trying to essentially ram it to hook it.

The catcher drone may be an effective standard method to use for all landings, where each incoming floating solar energy facility (generally only at 20 mph scale) gets a drone guide, holding an attachment hook on a line with the reel on a moving sled. This setup matches speed with the floating solar energy facility, and the drone anchors the floating solar energy facility in place. This can be run several times and the drone can continue to chase the floating solar energy facility for a distance to provide sufficient hooking chances. A redundant ground capture vehicle and catcher drone may be deployed at midway along the rail in case the main catcher is unsuccessful.

Tether Damage

In this scenario, the main tethers either fray or are cut. To ensure that the system can still work, there are two backups. First, each tether may be is doubled, so a broken tether simply passes the load to the other. Each have very high safety factors for solo operation, so will be effective alone. Additionally, if both are cut then the vertical tethers alone can hold the balloon and tank together. If one of the main tethers is totally lost and so is the side vertical tether, any one line can hold up the tank, with the only loss being the controlled use of the paragliding wing. The thrusters can still be used. In the worst case, if the tank is dangling and the power to thrusters are cut, the system still retains buoyancy so is in no immediate danger. It can shift to emergency return mode, and rely on the Shepherd ship to tow it home.

Variations

Several concepts are suggested for later version designs; this includes adjustments to the design presented above as well as the use of additional vehicles in the process.

Shuttle

A larger scale version of the design concept includes the use of a separate vehicle for transporting the tanks up to altitude and back down again. This shuttle would take off like a floating solar energy facility, and could be controlled via two inflatable segments, located at the front and back ends of the shuttle. By way of non-limiting example, the shuttle would have a long cylindrical body with the inflatable balloons at either end, and a symmetric set of large inflated wings in the center. Also in the center would be a bay for storing multiple tanks, with doors that could open upwards to access the tanks. By way of non-limiting example, the ends of the wings would have axially aligned propellers.

Upon reaching altitude, the shuttle balances the lift between the two balloons, which allows the shuttle to hold stationary and horizontal at altitude without drawing power. The shuttle then adjusts its two balloons for z axis control and use its two propellers for x and θ z control to position itself under an energy harvester. Once below, a gantry arm may grab and remove the full tank, then replace it with a full one. This arrangement has the advantage of moving the tanks, rather than directly transferring the gas, as the gas would require re-pumping.

The shuttle gathers as many tanks as it could fit, which, in turn, reduces lift in the front balloon and start to tip/glide on down to ground. By way of non-limiting example, the shuttle could gather 5-10 tanks, although a much larger number, such as 100 or 500 tanks, could be gathered. The balloons would be gradually emptied and width drawn into the shuttle so it may land as a plane. This allows for fine control of the landing process as well as a rapid descent.

Such a system would enable rapid controlled transit, while keeping the harvesters where they are most effective—at altitude, and using a plane like vehicle to transit the highly populated airspace. The use of multiple tank carrying capacity would reduce the number of travel iterations, reducing the issue with passing through jet accessible air space. The energy harvesters would simply stay at altitude for long periods of perhaps a year or more at a time, gathering energy.

The shuttle would also provide easy access to repair/maintenance for the other envisioned system capabilities (imaging, surveillance, telecommunications, etc.) and would serve as a platform for the intended low earth orbit access. In this application, it would serve as an edge-of-atmosphere space shuttle.

The shuttle would allow deployment of large scale arrays over populated areas. Since the floating solar energy facilities would be staying at altitude, only tightly controlled vehicles would be needed for going up and down.

Floating Solar Energy Facility Coupling

Floating solar energy facilities may be controlled to come into near contact at altitude in order to tap into the wind screening effect; this would lower the drag on the sequential floating solar energy facilities, reducing the power demand.

Balloon Geometry

A possible improvement of the balloon geometry would involve shifting the balloon to a more ellipsoid Y-Z axis cross-section which would provide further area for panels. It may also be possible to use the floating solar energy facility geometry to generate lift in the steady headwinds it will face;

this could reduce the required size of the floating solar energy facility. This may well be possible using the paragliding wings.

Solar Energy Capture

Future designs may find it more effective to use solar thermal electrolysis, or some sort of a solar to mechanical to electrical process to gather more energy. Alternately, lightweight solar concentrators (such as the inflatable lens concept) would be ideal for reducing the solar panel mass while retaining the same power and generally same cost structure. The solar panel mass comprises a majority large portion of the overall mass and so would provide significant gains in the system if reduced.

Transfer of Energy to an Electrical Grid

The aerosolar energy harvesting system may be used to augment a terrestrial based energy production facility having an interruptible energy source, such as a solar or wind energy production facility. In that function, the ground station may be located close to the terrestrial based energy production facility as to permit the energy transferred to the ground station to augment the energy of the terrestrial based energy production facility. The terrestrial based energy production facility would be able to use the energy transferred by the ground station to provide the ground-based energy production facility with an energy supply for use when the ground-based energy production facility produces below an allowable grid delivery rate for the ground-based energy production facility.

By associating the ground station with the terrestrial based energy production facility, the interconnection capacity of the ground station can be used to transfer energy to an electrical grid when the terrestrial based energy production facility is interrupted or below capacity. Such interrupted or below-capacity operation would be the case with a terrestrial solar energy production facility at night. This allows using the landed energy storage system to provide a controllable load to take excess generation from the grid for storage and later delivery. The ground station may also be located off shore and providing the transfer of energy to the grid on shore via a submarine or floating power cable system.

Hydrogen Storage

It may be possible to reduce the overall tank cost and mass by storing the hydrogen in liquid form; however, the process to chill and maintain hydrogen in its liquid form consumes a substantial amount of energy and hardware.

Other Forms of Energy Capture Automated Vehicles

This same concept may be extensible to other vehicles, including boats. Clusters of energy harvesting boats could avoid clouds and storms, and then produce fresh water from the distillation of the seawater (or using solar thermal evaporation to generate pure water).

Storage and Transport

Drone compressed storage could be useful to reducing the area required to store the drones when they are brought down, it could also help in transportation. The drones could be compressed for storage, by letting all of the air out of the air chamber. Several steps could be taken to avoid damaging the drone.

First, the drone skin could be developed to have several locations, folding joints, where the carbon fiber is replaced with a specifically flexible foldable fiber. Carbon fiber is desired for the fabric due to its mass production scale, high strength to weight and UV resistance; however, it is liable to damage when creased. The use of flexible foldable fiber joints would localize the creases and help the structure to bend at only specific locations if needed. Localizing the crease to specific joint locations would expand the range of materials that could be used in the balloon fabric. A possible location for this joint in the skin material would be along the joining line between gores. The preferred layout for the gores in the balloon is from front to back, so each gore stretches nearly the full length of the balloon from furthest +x extent to furthest −x extent.

Second, the enforced bends could be constrained by a low cost clamping element to limits the minimum radius of curvature, so as to ensure the material never reaches a dangerous threshold. This would effectively be a bar that the material is wrapped around, and perhaps a c-shaped cross section clip that would go around the outside. The combination would enforce a certain minimum radius of curvature to the material, but could be removed during unpacking.

Third, the main elements on the structure would need to be removed, which may, by non-limiting example be tension lines, tethers, panels, compression elements and thrusters. This would leave only the nested balloons as a structure.

Fourth, several kinds of folding could be used, one of which is described here. It is desired to bring the overall packed drone balloon volume down to an easily shippable size, such as that of a shipping container. Fold joints could be placed on the balloon running along the top and bottom from the front to the back of the design. These points mark the edges of the balloon in FIGS. 1A, 1B and 2. Once the front and back end caps (at the poles of the system) are removed, the balloon could then be laid out roughly flat on the ground without fold damage. Depending on the size, the balloon could be folded along its long axis one more time if desired, which would need either a fold constraint or fold joint. The constraint (foam bar, etc.) would be acceptable here as it could be inserted before the structure is folded, which is not possible for the top and bottom edge. The fold along the long axis shrinks the extension of the balloon down to generally under 15 m, which, by way of non-limiting example, may be the maximum length of a cargo container. Now the drone as a flat sheet could be compressed into a wave-like meander pattern which expands it into the third dimension and reduces length. Such at pattern can be rolled back on itself to make multiple layers. Thus it should be possible to fit the whole structure into the cargo container such that it unrolls out from the long face. The meander compression could be enabled by using a packing frame with large rollers that the structure is wrapped around. This would make the compression process easy and stable once complete.

In the station, the drone could be compacted by letting the air out, and letting the drone fold along its spinal fold material running along the top and bottom. The solar panel array would need to have a gap in it to allow it to fold to either side of the top spine. The drone would have to be hung or supported by a frame to ensure the thrusters and other items do not damage the skin. This should reduce the width by a significant factor, almost 10×, once the air is removed.

Balloon Fabrication

A possible means of mass production of the balloon skin is suggested by the folding joints concept. This would be to form gores of the desired laminate with high performance biaxially oriented carbon fiber. The gores would extend from the front to back of the balloon (+x to −x direction extent). Such gores could be mass manufactured as a flat laminate and with both axes of fiber laid down, perhaps one aligned to the long axis of the gore and one perpendicular to it. The fiber would extend out to just before the edges of the gore.

The non-fiber covered edges of the gore would be heat sealed to the next gore over, and a tape composed of the foldable joint fiber would be placed down over this seam.

Thus every joint between every gore could become a foldable joint, and the whole structure could be packed up if needed without creasing the carbon fiber. Such design decoupling would provide the benefits of both material and flexibility, as the majority of the surface area of the balloon would thus be the high strength-to-weight carbon fiber, but it would have a level of foldability that could not be found by a fully carbon fiber structure and is usually associated with much more expensive/heavier materials.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An airborne energy collection vehicle comprising:
   a balloon structure comprising a lighter than air envelope structure comprising:
      an outer gas envelope formed of a substantially inelastic material;
      at least one inner gas envelope at least partially separate from the outer gas envelope, contained within the outer gas envelope, and configured to hold lifting gas as a buoyancy medium for the airborne energy collection vehicle, with at least a portion of a space between the inner gas envelope and outer gas envelope filled with air;
      a flexible diaphragm forming at least a portion of the inner gas envelope separate from the outer gas envelope and contained within the outer gas envelope, whereby the flexible diaphragm causes the inner gas envelope to maintain an equilibrium pressure with the outer gas envelope and allows expansion and contraction of the inner gas envelope to substantially fill the space of the outer gas envelope from a relatively smaller fraction of the outer gas envelope;
   an air chamber pressurization mechanism capable of maintaining the outer gas envelope gas pressure at a target value;
   an air chamber pressurization controller that monitors the outer gas envelope pressure and either pumps in air or vents air to bring a gauge pressure to the target value;
   a photovoltaic collector array receiving solar energy;
   an energy storage facility receiving energy from the photovoltaic collector array and converting the energy to stored energy.

2. The airborne energy collection vehicle of claim 1, further comprising:
   a lifting gas storage container array comprising at least one lifting gas storage tank;
   a fuel precursor supply;
   the energy conversion plant using the received energy from the photovoltaic collector array to convert precursor material from the precursor supply to a high energy fuel as the stored energy.

3. The airborne energy collection vehicle of claim 1, wherein:
   the fuel precursor comprises water, and wherein
   the lifting gas and the high energy fuel comprise hydrogen, and wherein said one lifting gas storage tank provides storage for the hydrogen produced by the energy conversion plant.

4. The airborne energy collection vehicle of claim 1, wherein:
   the energy storage facility comprises storage batteries.

5. The airborne energy collection vehicle of claim 1, wherein:
   the energy storage facility comprises an inertial mass.

6. The airborne energy collection vehicle of claim 1, wherein:
   the outer gas envelope substantially contains the inner gas envelope, thereby providing structural integrity and puncture resistance to the inner gas envelope to allow for optimization of leakage characteristics of the inner gas envelope as part of a puncture resistant lighter than air envelope structure.

7. The airborne energy collection vehicle of claim 1, further comprising:
   gas supply controllers separately controlling gas supply to the outer gas envelope and lifting gas supply to the inner gas envelope, thereby maintaining a safe and controlled inflation pressure and providing a consistently inflated body structure; and
   at least one thruster mounted to the body structure.

8. The airborne energy collection vehicle of claim 1, further comprising:
   a plurality of tethers connecting the balloon structure to an externally carried section, the externally carried section carrying the lifting gas storage container array, the precursor supply and the energy conversion plant; and
   the plurality of tethers having a configuration for shifting a position of the outer gas envelope to facilitate navigation and to position the photovoltaic collector array to an optimum position for receiving solar energy in accordance with the incidence of solar energy on the airborne energy collection vehicle.

9. The airborne energy collection vehicle of claim 1, further comprising:
   the photovoltaic collector array mounted at a position away from a top position of the outer gas envelope sufficient to permit the airborne energy collection vehicle to position the photovoltaic collector array in an optimal position with respect to the sun by tilting and rotation of the airborne energy collection vehicle.

10. The airborne energy collection vehicle of claim 9, wherein the mounting of the photovoltaic collector array centers the photovoltaic collector array at close to 45° from a top position in a manner to configure the airborne energy collection vehicle to achieve the optimal position with respect to the sun with a minimized range of tilting of the airborne energy collection vehicle.

11. The airborne energy collection vehicle of claim 1, further comprising:
   a transfer mechanism comprising a pump for transferring lifting gas between the inner gas envelope and the lifting gas storage container.

12. The airborne energy collection vehicle of claim 1, further comprising:
   means for the lift gas to be added to the lift gas envelope from the lifting gas storage tank; and
   means for the lift gas to be transferred by at least one of venting from the lift gas envelope to the environment or pumped back into the lifting gas storage tank.

13. An airborne energy collection system comprising:
   a plurality of airborne energy collection vehicles, at least a subset of the airborne energy collection vehicles each comprising:

a lighter than air envelope structure comprising:
   an outer gas envelope;
   an inner gas envelope at least partially separate from the outer gas envelope, contained within the outer gas envelope, and configured to hold lifting gas as a buoyancy medium for the airborne energy collection vehicle, with at least a portion of a space between the inner gas envelope and outer gas envelope filled with air;
   a flexible diaphragm forming at least a portion of the inner gas envelope separate from the outer gas envelope and contained within the outer gas envelope, whereby the flexible diaphragm causes the inner gas envelope to maintain an equilibrium pressure with the outer gas envelope;
  an energy production unit comprising a photovoltaic collector array receiving solar energy;
  an energy conversion unit receiving energy from the photovoltaic collector array and converting the energy for storage;
  at least one airborne vehicle providing a docking port for a drone, wherein the drone provides a capability of monitoring, maintenance, repair or rescue of the plurality of airborne rescue vehicles including configuring a damaged airborne energy collection vehicle for recovery.

14. The airborne energy collection system of claim 13, wherein the configuring the damaged airborne energy collection vehicle for recovery comprises, in the case of a determination that one airborne energy collection vehicle can link to a damaged airborne energy collection vehicle without damaging said one airborne energy collection vehicle, the drone links said one airborne energy collection vehicle to the damaged airborne energy collection vehicle.

15. The airborne energy collection system of claim 13, wherein the energy conversion unit, upon receiving energy from the photovoltaic collector array, converts a precursor material to a high energy fuel.

16. The airborne energy collection system of claim 13, wherein the energy conversion unit, upon receiving energy from the photovoltaic collector array, stores the received energy as a battery charge.

17. The airborne energy collection system of claim 13, wherein:
   the energy conversion unit stores the received energy in an energy storage system comprising an inertial mass.

18. An airborne energy collection system comprising:
   a plurality of airborne energy collection vehicles, at least a subset of the airborne energy collection vehicles each comprising:
     a lighter than air envelope structure comprising:
       an outer gas envelope;
       an inner gas envelope at least partially separate from the outer gas envelope, contained within the outer gas envelope, and configured to hold lifting gas as a buoyancy medium for the airborne energy collection vehicle, with at least a portion of a space between the inner gas envelope and outer gas envelope filled with air;
       a flexible diaphragm forming at least a portion of the inner gas envelope separate from the outer gas envelope and contained within the outer gas envelope, whereby the flexible diaphragm causes the inner gas envelope to maintain an equilibrium pressure with the outer gas envelope;
     an energy production unit comprising a photovoltaic collector array receiving solar energy;
     an energy conversion plant receiving energy from the photovoltaic collector array and converting the energy for storage;
   a ground-based docking system, at a land or sea location, for transferring energy collected by the airborne energy collection vehicles;
   an intertie to transfer at least a portion of the transferred energy to an electrical grid.

19. The airborne energy collection system of claim 18, further comprising:
   the ground-based docking system located sufficiently close a ground-based energy production facility that an interconnection capacity between the docking system and the ground-based energy production facility provides the ground-based energy production facility with an energy supply for use when the ground-based energy production facility produces below an allowable grid delivery rate for the ground-based energy production facility.

20. The airborne energy collection system of claim 19, further comprising:
   the ground-based energy production facility using the transferred energy as a part of a landed energy storage system to provide a controllable load to take excess generation from the electrical grid for storage and later delivery.

21. The airborne energy collection system of claim 19, further comprising:
   the ground-based energy production facility located off shore and providing the transfer of energy to the grid on shore via a submarine or floating power cable system.

22. The airborne energy collection system of claim 18, further comprising:
   the ground-based docking system located sufficiently close a ground-based energy production facility that an interconnection capacity provides the ground-based solar energy production facility with an energy supply for use when the ground-based solar energy production facility produces below an allowable grid delivery rate for the ground-based solar energy production facility.

* * * * *